United States Patent [19]

Ferenczi et al.

[11] Patent Number: 5,315,906

[45] Date of Patent: May 31, 1994

[54] AUTOMATED EXTRUSION PROCESSING MACHINE

[75] Inventors: Laszlo Ferenczi, Irving; Mark A. Turner; Gregory A. Prince, both of Arlington, all of Tex.

[73] Assignee: Vought Aircraft Company, Dallas, Tex.

[21] Appl. No.: 884,118

[22] Filed: May 15, 1992

[51] Int. Cl.$^5$ .............................................. B26D 5/42
[52] U.S. Cl. ........................................ 83/27; 83/76.9; 83/151; 83/277; 83/282; 83/452
[58] Field of Search ............... 83/13, 27, 76.9, 113, 83/151, 206, 277, 282, 460, 452, 486.1, 488, 56, 461

[56] References Cited

U.S. PATENT DOCUMENTS

| | | | |
|---|---|---|---|
| 3,182,538 | 5/1965 | Whitmore et al. | 83/277 X |
| 3,707,103 | 12/1972 | Tishken | 83/113 |
| 3,910,142 | 10/1975 | Jureit et al. | 83/71 |
| 3,945,282 | 3/1976 | Aizawa | 83/277 X |
| 3,979,983 | 9/1976 | Daniels | 83/277 |
| 4,048,833 | 9/1977 | Lorenz | 83/277 X |
| 4,574,670 | 3/1986 | Johnson | 83/409 |
| 4,641,557 | 2/1987 | Steiner et al. | 83/71 |
| 4,642,752 | 2/1987 | Debarbieri et al. | 364/167 |
| 4,644,832 | 2/1987 | Smith | 83/72 |
| 4,691,601 | 9/1987 | Peddinghaus | 83/56 |
| 4,823,662 | 4/1989 | Stolzer | 83/277 X |
| 4,866,630 | 9/1989 | Beaman et al. | 364/474.02 |
| 5,088,364 | 2/1992 | Stolzer | 83/277 X |

Primary Examiner—Rinaldi Rada
Attorney, Agent, or Firm—Arnold, White & Durkee

[57] ABSTRACT

A machine for processing a workpiece is disclosed. Preferably, the machine includes a circular saw blade that may be positionable about multiple axes with respect to the workpiece. The machine is particularly suited for processing an elongated workpiece. The machine includes two gripping mechanisms and three vises that cooperate with one another to move an elongated workpiece into position, hold the workpiece while it is being processed, and remove the workpiece from the machine. The machine also includes a computer system that controls the orientation of the saw blade and the movements of the vises and gripping mechanisms.

37 Claims, 21 Drawing Sheets

FIG. 7

```
500 →    MAIN MENU

1 - CREATE NEW PART PROGRAM
         2 - RUN EXISTING PART PROGRAM
         3 - MACHINE HOME SEQUENCE
         4 - LIST PART PROGRAMS STORED
         5 - UTILITY MENU
         0 - EXIT TO DOS
                              * STATUS
```

FIG. 8

```
502 →    TYPE OF EXTRUSION

PLEASE SELECT ONE OF THE FOLLOWING:

1 - (L) EXTRUSION
         2 - (Z) EXTRUSION
         0 - RETURN TO MAIN MENU
```

FIG. 9

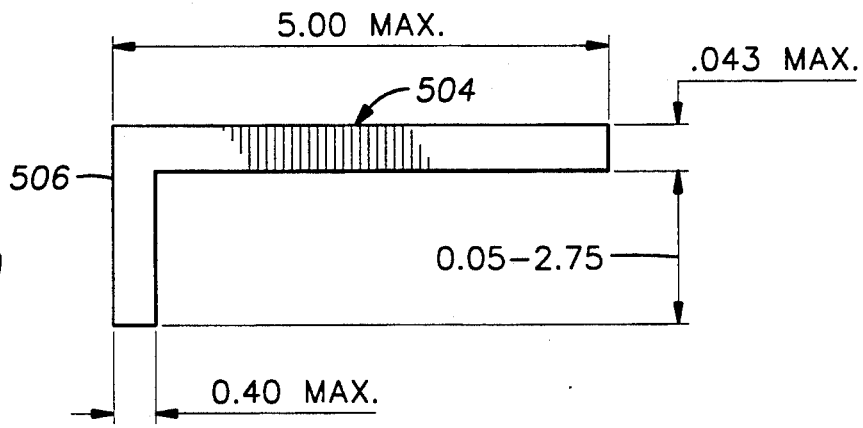

FIG. 10

```
510 →    CREATE PART PROGRAM ROUTINE
         ENTER MAJOR SAMPLE PART DIMENSIONS
         SELECT TRAILING LOWER LEG ANGLE

1 - STRAIGHT
         2 - IN
         3 - OUT
         0 - RETURN TO MAIN MENU
         PART NUMBER
```

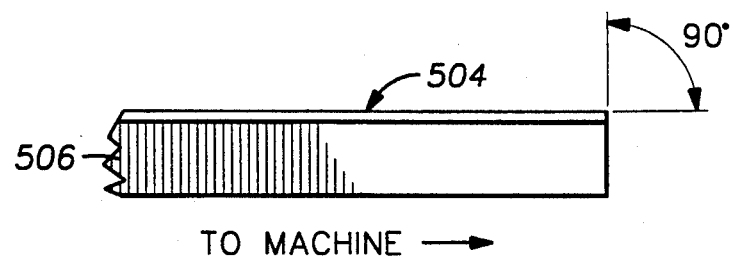
FIG. 11
TO MACHINE →
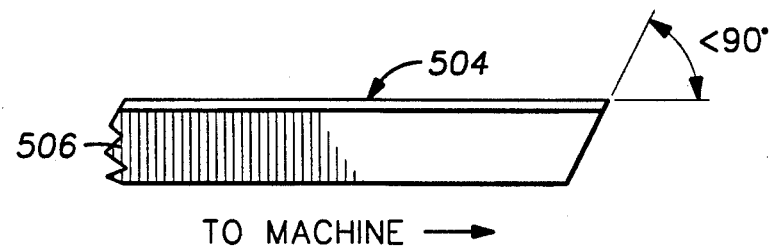
FIG. 12
TO MACHINE →
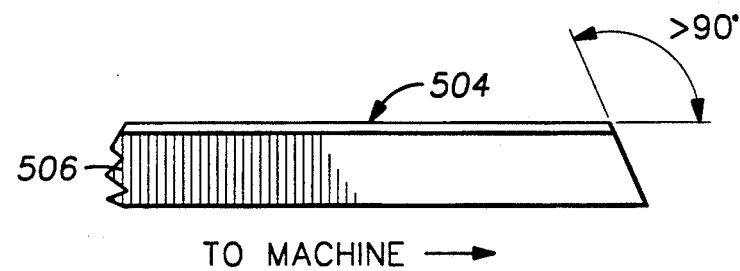
FIG. 13
TO MACHINE →
```
512 →    CREATE PART PROGRAM ROUTINE
       ENTER MAJOR SAMPLE PART DIMENSIONS
         SELECT LEADING LOWER LEG ANGLE
       1 - STRAIGHT
       2 - IN
       3 - OUT
       0 - RETURN TO MAIN MENU
       PART NUMBER
```
FIG. 14

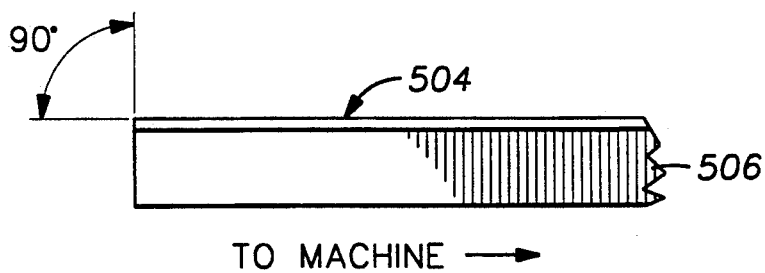
FIG. 15
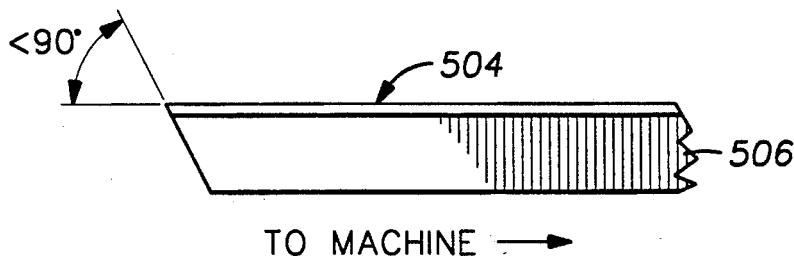
FIG. 16
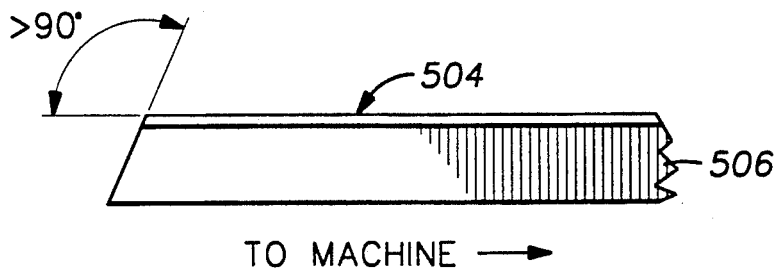
FIG. 17
```
* ENTER Y-AXIS LEADING LANDING    (###) - ____
* ENTER Y- AXIS TRAILING LANDING  (###) - ____
* ENTER X-AXIS LENGTH OF SAMPLE PART   - ____
* IS THE SAMPLE PART LOWER
  LEG LONGER THAN 1.00 IN.       (Y OR N) - ____
PART NUMBER
```
FIG. 18

594

INPUT STATUS

| OPERATION | INPUT # | BIT STATE | LED STATUS |
|---|---|---|---|
| X – GRIPPER (OPEN) | IN23 | 1 | OFF |
| X – GRIPPER (CLOSED) | IN23 | 0 | ON |
| X – OFFSET (RETRACT) | IN22 | 0 | OFF |
| X – OFFSET (EXTEND) | IN22 | 1 | ON |
| U – GRIPPER (OPEN) | IN15 | 1 | OFF |
| U – GRIPPER (CLOSED) | IN15 | 0 | ON |
| U – OFFSET (RETRACT) | IN16 | 0 | OFF |
| U – OFFSET (EXTEND) | IN16 | 1 | ON |
| FEED STOP (EXTEND) | IN14 | 1 | ON |
| FEED STOP (RETRACT) | IN13 | 1 | ON |
| BLADE (UP) | IN10-IN11-1N12 | 0-1-1 | ON-OFF-OFF |
| BLADE (MIDDLE) | IN10-IN11-1N12 | 1-0-1 | OFF-ON-OFF |
| BLADE (DOWN) | IN10-IN11-1N12 | 1-1-0 | OFF-OFF-ON |
| HVY/LGT CLAMPS (UP) | IN1-IN5 | 0-0 | ON-ON |
| HVY/LGT CLAMPS (DOWN) | IN1-IN5 | 1-1 | OFF-OFF |
| LOAD VISE (EXTEND) | IN2 | 1 | OFF |
| LOAD VISE (RETRACT) | IN2 | 0 | ON |
| LOAD STOP (RETRACT) | IN3-IN4 | 1-0 | OFF-ON |
| LOAD STOP (EXTEND) | IN3-IN4 | 0-1 | ON-OFF |
| LEAD VISE (RETRACT) | IN6 | 0 | ON |
| LEAD VISE (EXTEND) | IN6 | 1 | OFF |
| TRAILING VISE (RETRACT) | IN7 | 0 | ON |
| TRAILING VISE (EXTEND) | IN7 | 1 | OFF |

PUSH BOTTOMS

| BUTTON | INPUT # | BIT STATE |
|---|---|---|
| CYCLE START (IN) | IN18 | 1 |
| CYCLE START (OUT) | IN18 | 0 |
| JOG/FOOTSWITCH (IN) | IN19 | 0 |
| JOG/FOOTSWITCH (OUT) | IN19 | 1 |
| CYCLE PAUSE (IN) | IN20 | 1 |
| CYCLE PAUSE (OUT) | IN20 | 0 |
| CONTROL ON (IN) | IN21 | 0 |
| CONTROL ON (OUT) | IN21 | 1 |
| EMERGENCY STOP (IN) | IN24 | 1 |
| EMERGENCY STOP (OUT) | IN24 | 0 |

FIG. 34

```
596 →    3 -  SAW MOTOR ON
         5 -  SAW MOTOR OFF
         7 -  (X) GRIPPER OPEN
         8 -  (X) GRIPPER CLOSED
         9 -  (U) GRIPPER OFFSET RETRACT
        10 -  (U) GRIPPER OFFSET EXTEND
        11 -  (X) GRIPPER OFFSET RETRACT
        12 -  (X) GRIPPER OFFSET EXTEND
        13 -  FEED STOP EXTEND
        14 -  FEED STOP RETRACT
        15 -  SAW HEAD UP/DOWN
        16 -  LOADING AND LEADING CLAMPS UP/DOWN
        17 -  CYCLE START LIGHT OFF/ON
        18 -  LOAD VISE EXTEND/RETRACT
        19 -  LOAD STOP EXTEND/RETRACT
        20 -  C-AXIS AIR MOTOR CW/CCW
        21 -  FEED SHUTOFF VALVE ON/OFF
        22 -  LOAD LIGHT ON/OFF
        23 -  CYCLE PAUSE LIGHT ON/OFF
        24 -  LEAD VISE RETRACT
        25 -  LEAD VISE EXTEND
        26 -  TRAILING/UNLOAD VISE RETRACT
        27 -  TRAILING UNLOAD VISE EXTEND
        28 -  (U) GRIPPER OPEN
        29 -  (U) GRIPPER CLOSED
        30 -  END OF PROGRAM
```

FIG. 35

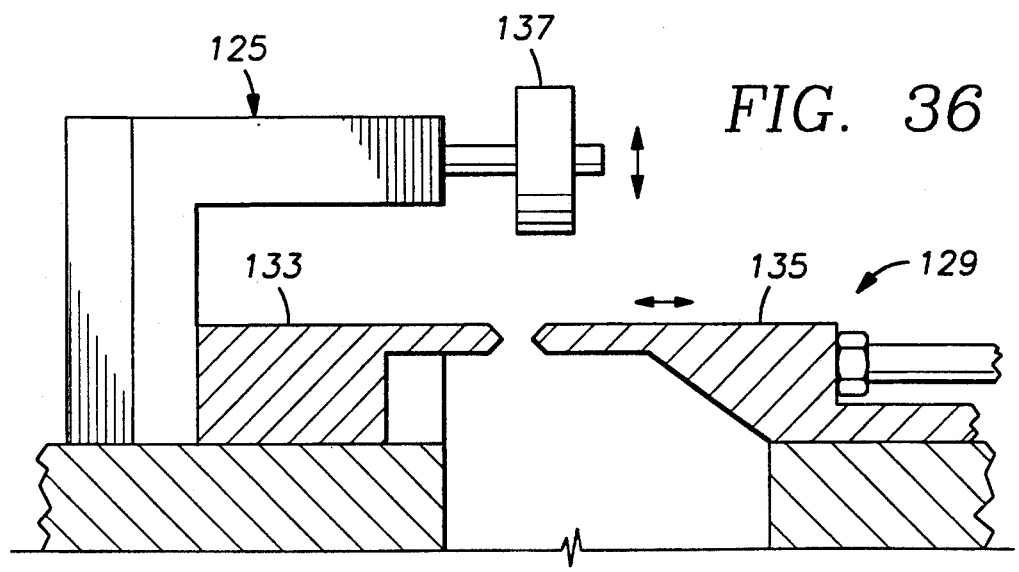

FIG. 36

AUTOMATED EXTRUSION PROCESSING MACHINE

BACKGROUND OF THE INVENTION

1. Field of the Invention

The present invention relates generally to industrial processing machines and, more particularly, to automatic sawing machines.

2. Description of the Related Art

Power saws are well-known and are used in a wide variety of applications. Circular saws, for instance, have long been used as an economical means for cutting wood, metal, and other materials. Power saws may be used to segment a workpiece, to cut completely or partially through a workpiece, or to bevel or miter a workpiece.

In the past, a number of operations required to transform a workpiece from a first state to a second or useable state have been done in a manual or semi-automatic fashion. In manual operations, the workpiece is totally transformed to its useable state as a result of an operator manipulating the power saw and/or workpiece. In semi-automatic operations, a power saw may be adapted to manipulate a workpiece under the selective control of an operator. Of course, the success of either the manual or semi-automatic operations is limited, to varying degrees, by the operator's own capabilities and skill.

Typically, as the complexity of the operation on the workpiece increases, automation becomes more difficult and a greater amount of operator interaction is required. The cutting of miter-ended, extruded parts often requires the use of several machines with multiple set-ups and operations. The operator of a power saw performing these operations can spend a good deal of time setting up the power saw to make some of the more complicated cuts. Generally, this set-up can involve manually adjusting the elevation of the saw blade with respect to the workpiece, manually setting the miter angle to be cut, and manually setting any desired bevel angle. Even an operator who takes the time to perform these operations carefully does not always achieve the desired accuracy from cut to cut simply because the accuracy of the resulting cut is dependent in part upon the operator's technique in performing the set-up operation. It is not uncommon to find that different operators using the same equipment can achieve widely varying results, depending upon their techniques.

In relatively recent times, automatic sawing machines have become available for workpiece operations. For example, a number of commercial robots are available which are capable of performing various operations on a workpiece. These automatic sawing machines are known in the art to possess several automatic or semi-automatic features. These features may include the automatic advancement of a cutting blade into a workpiece and the subsequent retraction of the blade to a home position, the automatic advancement of a workpiece in the direction of workflow to a desired sawing position, and a computer to control some aspects of the machining operation. In fact, due to the high cost of raw material and labor, and in view of the aforementioned operator inaccuracies and the resulting waste, automatic and computer-controlled sawing machines are becoming economically more feasible. Of course, as the accuracy and repeatability of automatic sawing machines increases, so does their usefulness.

The present invention is directed to overcoming, or at least reducing the affects of, one or more of the problems set forth above.

SUMMARY OF THE INVENTION

In accordance with one aspect of the present invention, there is provided a machine for processing an elongated workpiece. The machine includes a frame. A first gripping mechanism is coupled to the frame. The first gripping mechanism is controllably moveable on the frame along a first predetermined path and has an openable and closeable jaw which is positioned to respectively release and grip the workpiece. A second gripping mechanism is coupled to the frame in spaced apart relation to the first gripping mechanism. The second gripping mechanism is controllably moveable on the frame along a second predetermined path and has an openable and closeable jaw which is positioned to respectively release and grip the workpiece. The machine also includes a processing mechanism that is coupled to the frame in a predetermined relation to the first gripping mechanism and the second gripping mechanism. The processing mechanism is adapted to process the workpiece, and may, for instance, be used to saw through the workpiece in a desired manner.

In accordance with another aspect of the present invention, there is provided a machine for processing an elongated workpiece. The machine includes a frame having a main portion and having an elongated portion that extends outwardly from the main portion generally along an X-axis. The machine also includes a first gripping mechanism coupled to the main portion of the frame. The first gripping mechanism is controllably moveable on the main portion of the frame along the X axis and has an openable and closeable jaw that may be positioned to respectively release and grip the workpiece. A second gripping mechanism is coupled to the elongated portion of the frame in spaced apart relation to the first gripping mechanism. The second gripping mechanism is controllably moveable on the elongated portion of the frame along the X axis and has an openable and closeable jaw that may be positioned to respectively release and grip the workpiece. The machine further includes a first vise that is coupled to the main portion of the frame above and adjacent the first gripping mechanism. The first vise has an openable and closeable jaw that may be positioned to respectively release and grip the workpiece. A second vise is also coupled to the main portion of the frame above and adjacent the second gripping mechanism. The second vise has an openable and closeable jaw that may be positioned to respectively release and grip the workpiece. The machine further includes a processing mechanism that is coupled to the main portion of the frame above and in a predetermined relation to the first vise and the second vise. The processing mechanism is adapted to process the workpiece, for instance, by sawing through the workpiece in a desired manner.

In accordance with yet another aspect of the present invention, there is provided a method described by the steps below. The jaw of a first gripping mechanism closes about a workpiece to grip the workpiece. The first gripping mechanism moves along a first predetermined path to position the workpiece at a first predetermined position. The jaw of a first vise is closed about the workpiece to grip the workpiece. The jaw of the first gripping mechanism is opened to release the workpiece. The workpiece is processed using a processing mechanism. The jaw of a second gripping mechanism is closed about the workpiece to grip the workpiece. The jaw of the first vise is opened to release the workpiece. The second gripping mechanism is moved along a second predetermined path to position the workpiece at a second predetermined position. The jaw of a second vise is closed about the workpiece to grip the workpiece. The workpiece is processed using the processing mechanism. The jaw of the second vise is opened to released the workpiece. The second gripping mechanism is moved along the second predetermined path to expel the workpiece from the machine.

BRIEF DESCRIPTION OF THE DRAWINGS

The foregoing and other advantages of the invention will become apparent upon reading the following detailed description and upon reference to the drawings in which:

FIGS. 4A-1, 4A-2, 4B-1, 4B-2, 4B-3, and 4C illustrate a flowchart describing the operation of a processing machine in accordance with the present invention;

FIG. 7 illustrates a main menu screen;

FIG. 8 illustrates a menu screen;

FIG. 9 illustrates an end view of an L-shaped workpiece;

FIG. 10 illustrates a menu screen;

FIG. 11 illustrates a leading edge portion of a workpiece having a 90° degree cut;

FIG. 12 illustrates a leading edge portion of a workpiece having a cut less than 90° degrees;

FIG. 13 illustrates a leading edge portion of a workpiece having a cut greater than 90° degrees;

FIG. 14 illustrates a menu screen;

FIG. 15 illustrates a trailing edge portion of a workpiece having a 90° degree cut;

FIG. 16 illustrates a trailing edge portion of a workpiece having a cut less than 90° degrees;

FIG. 17 illustrates a trailing edge portion of a workpiece having a cut greater than 90° degrees;

FIG. 18 illustrates a data entering screen;

FIG. 34 illustrates a data screen;

FIG. 35 illustrates a status screen;

FIG. 36 illustrates a side view of a load clamp and a load vise of a processing machine in accordance with the present invention.

Figure 1:
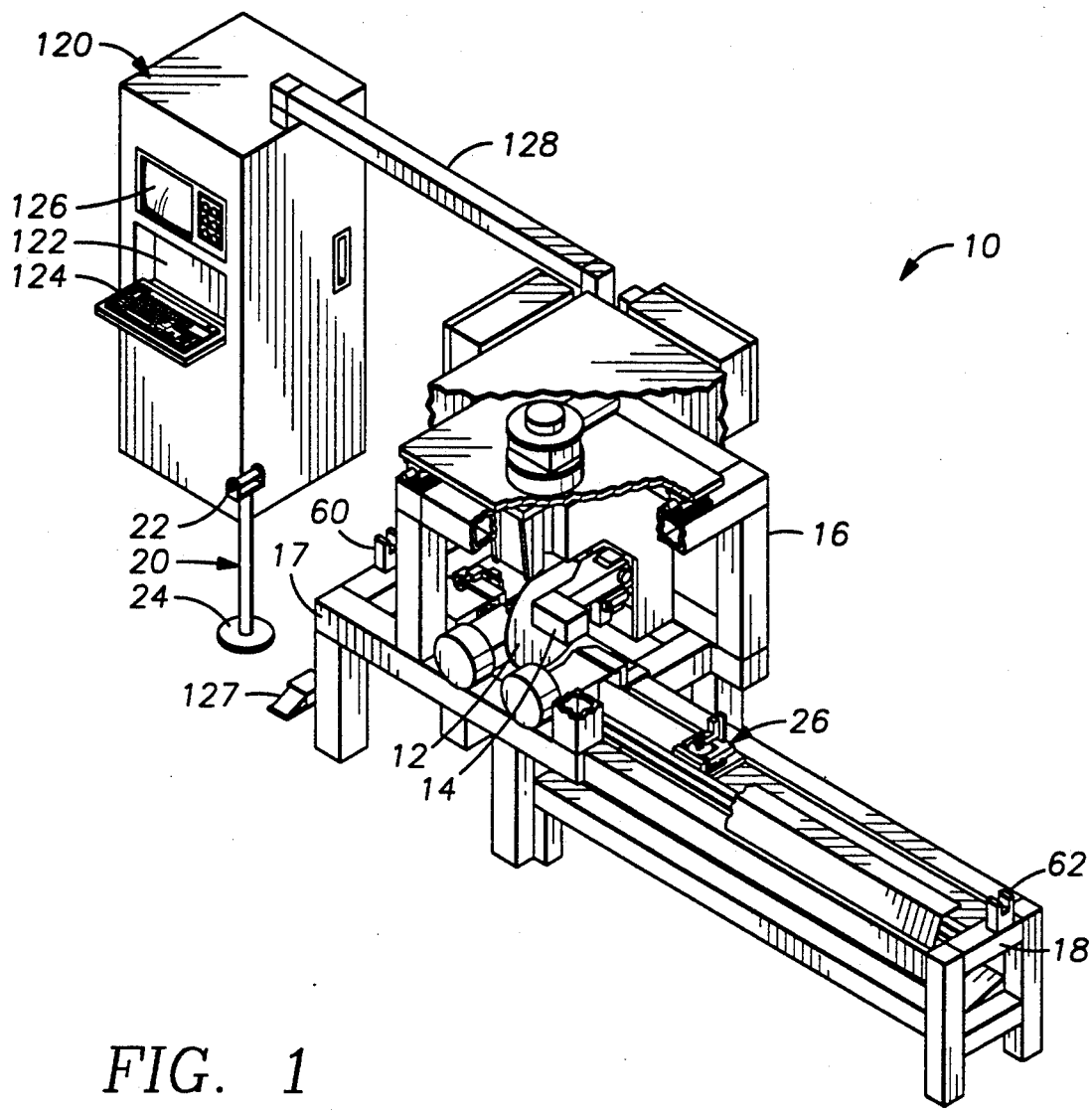
FIG. 1 illustrates a perspective view of a processing machine in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

Turning now to the drawings and referring initially to FIG. 1, a sawing machine is illustrated and generally designated by a reference numeral 10. The illustrated preferred embodiment of the machine 10 is adapted for cutting elongated materials, such as aluminum extrusions, into strips of desired lengths and configurations. The machine 10 uses a rotary saw having a blade 12 to cut a workpiece (not shown) as it passes through the machine 10. The saw blade 12 is driven by a motor 14.

The saw is mounted onto the frame 16 of the machine 10, which, in the preferred embodiment, includes a table 17 having an elongated portion 18. The elongated portion 18 and an associated, free standing, roller assembly 20 are used to guide an elongated workpiece through the machine 10 so that it can be processed by the saw. The roller assembly 20 preferably includes a roller member 22 that is attached to a free standing pedestal 24. Moreover, as will be subsequently described in greater detail herein, the table 17 and its elongated portion 18 include grippers and vises that move an elongated workpiece through the machine 10 and accurately position the workpiece, or portions thereof, in relation to the saw for processing.

Figure 2:
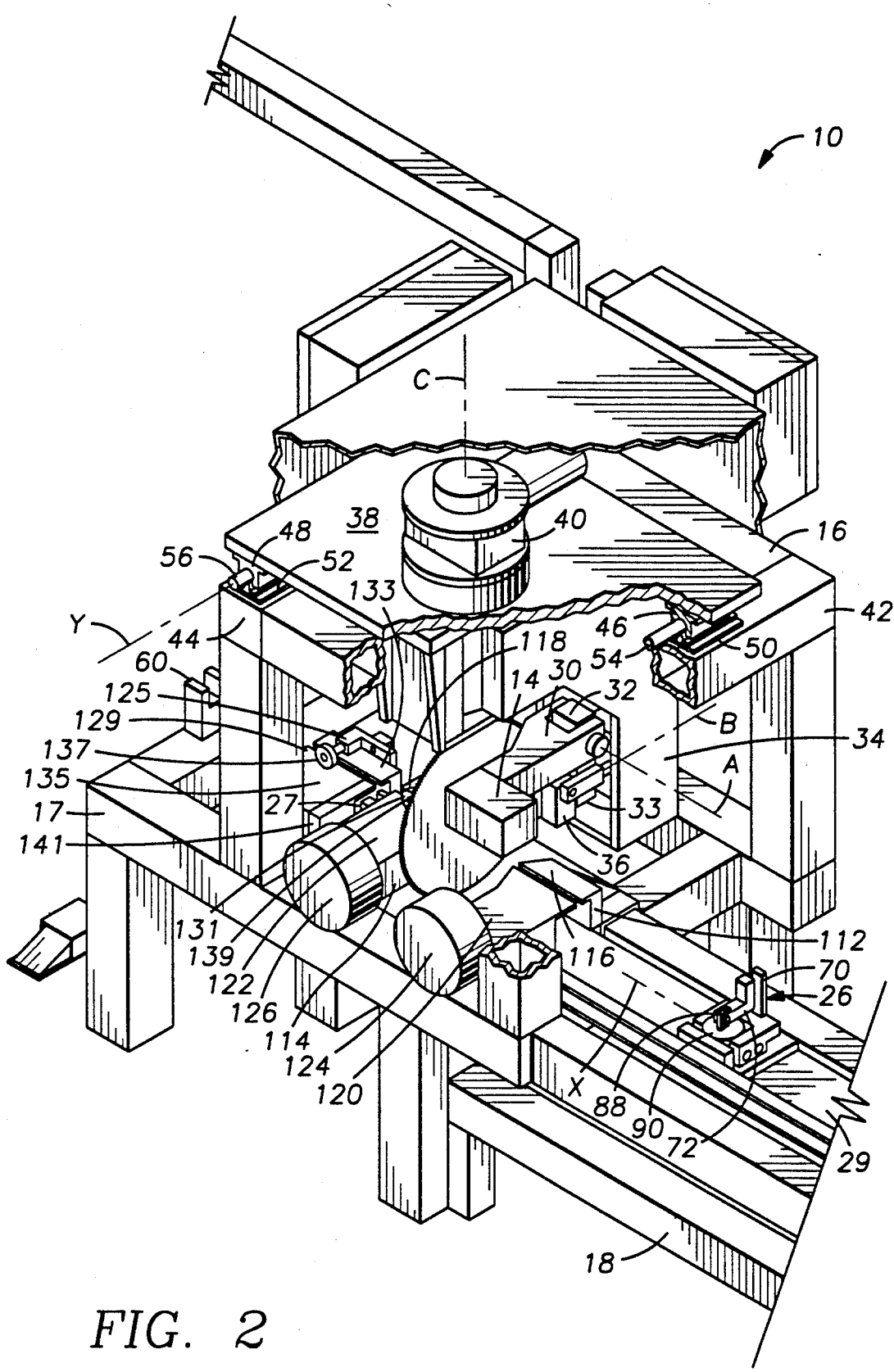
FIG. 2 illustrates a detailed perspective view of a portion of the machine illustrated in FIG. 1.
Figure 37:
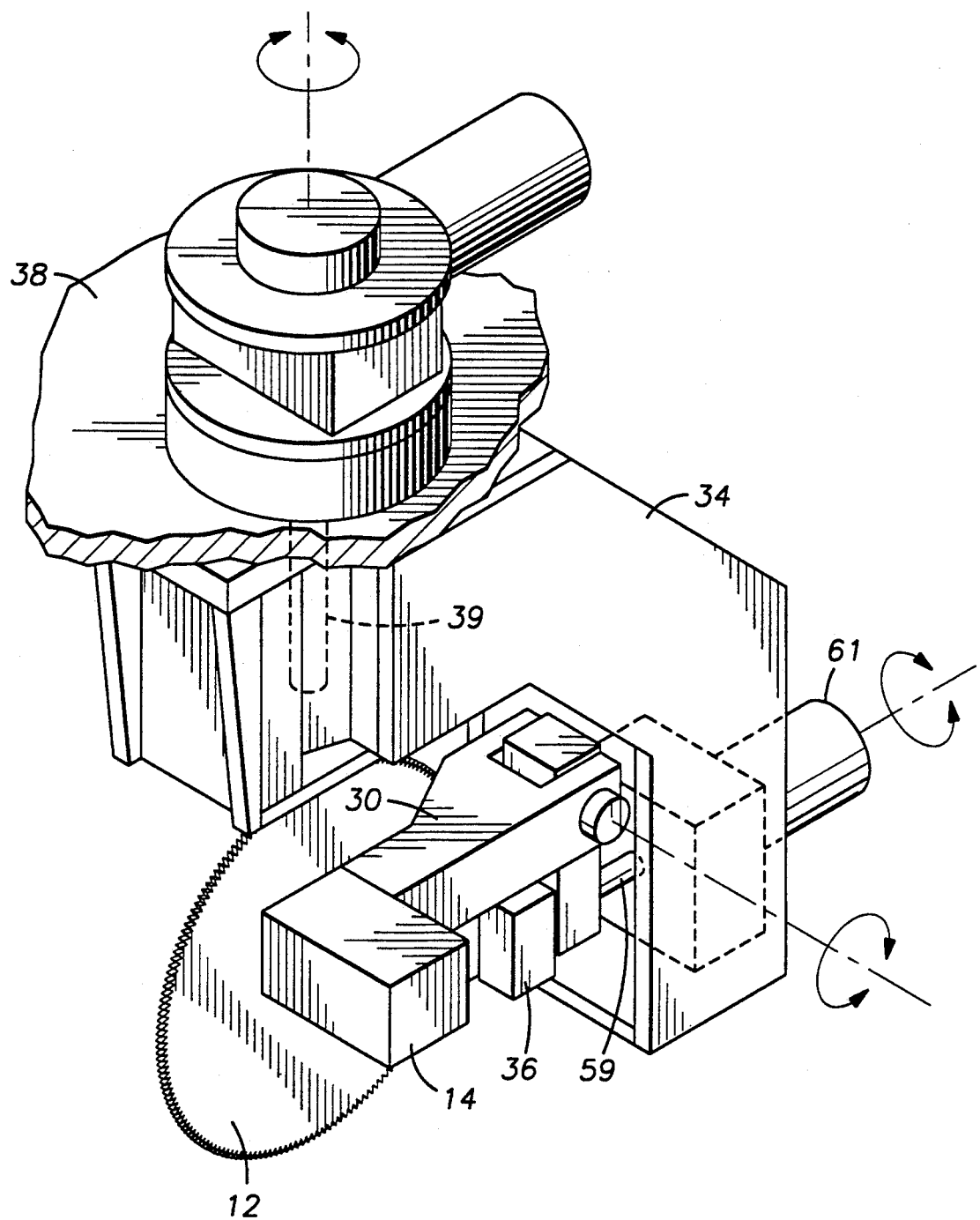
FIG. 37 illustrates a detailed view of a mounting arm in accordance with the present invention.

By referring also to FIGS. 2 and 37, the structure and operation of the saw can be explained in greater detail. The motor 14 is mounted at one end of a lever arm 30. The other end of the arm 30 is pivotally mounted, via a servo motor 32, to an inner portion of a curved arm 34. The servo motor 32 pivots the saw blade 12 about the "A" axis. The servo motor 32 is coupled to a fluidic cylinder, such as an air cylinder 36, that is extendable and retractable to move the arm 30, motor 14, and saw blade 12 upwardly and downwardly, respectively, generally along and parallel to the "C" axis.

A feed stop (not shown) is also preferably coupled to a mounting member 33. The feed stop preferably includes a fluidic cylinder that is coupled to the mounting member so that the piston of the cyliner extends upwardly toward the bottom of the arm 30. The piston may be positioned to abut against the bottom of the arm 30 to limit its downward movement before, during, or after cutting.

The opposite end of the curved arm 34 is pivotally connected to an upper portion 38 of the frame 16. A shaft 39 couples the upper end of the curved arm 34 to a gear box and motor 40 that is located above the upper portion 38 of the frame 16. The gear box and motor 40 are adapted to rotate the curved arm 34, and thus the saw blade 12, about the "C" axis.

The upper portion 38 of the frame 16 is preferably a plate that is slidably coupled to upper arms 42 and 44 of the frame 16. As illustrated, the slidable coupling includes rail portions 46 and 48 that are coupled opposite on another on the lower side of the plate 38. Complimentary rail portions 50 and 52 are coupled to the upper side of the upper arms 42 and 44, respectively. Associated rods 54 and 56 lock the upper rails 46 and 48 to the lower rails 50 and 52, respectively, so that the plate 38 may move back and forth along the "Y" axis, while substantially preventing movement in any other direction. An electric servo motor (not shown) is preferably coupled to the plate 38 to facilitate movement along the "Y" axis.

Finally, the saw may be pivoted about the "B" axis. The mounting member 33 is coupled by a shaft 59 to a gear box and motor 61 that is located inside the lower portion of the curved arm 34. Much like the gear box and motor 40, the gear box and motor inside the curved arm 34 are coupled to the mounting member 33 and rotate the mounting member 33, and thus the saw blade 12, about the "B" axis.

Prior to a cutting operation, the saw may be oriented about any of the three main axes, the "A" axis, the "B" axis, and/or the "C" axis. Additionally, the saw may be translated horizontally along the "Y" axis for laterally shifting the initial cutting point. When a workpiece is moved into a desired position, the saw is lowered onto the workpiece, using one or more of the moving mechanisms described above, to cut the workpiece as desired.

The machine 10 uses cooperating vises and grippers, one preferably of each on either side of the saw blade 12, to (1) pull an elongated workpiece into the machine 10, (2) accurately position the workpiece and hold it during all cutting operations, and (3) remove finished portions of the workpiece from the machine 10. As noted previously, the table 17 having the elongated portion 18 is well-suited for machining an elongated workpiece. To facilitate travel of an elongated workpiece through the machine 10, one or more roller assemblies 20 may be used to support portions of the workpiece before it enters the machine 10. Furthermore, one or more guides, such as the guides 60 and 62, may be positioned on the table 17 or on the elongated portion 18 to facilitate positioning of the workpiece as it moves through the machine 10.

The grippers 26 and 27 transport and position the workpiece. The grippers 26 and 27 are preferably adapted to slide on a common rail 29 generally along the "X" axis. Each of the grippers 26 and 27 preferably include a linear bearing (not shown) to facilitate this movement. Each gripper 26 and 27 is coupled to a respective belt (not shown), which is coupled to a respective stepper motor (not shown). The stepper motors controllably drive the respective belts to position the grippers at the desired locations. The gripper 27 is typically located on the input side of the machine 10 and is generally used to draw the workpiece into the machine 10 and to locate it relative to the saw blade 12. The gripper 26 is typically located on the output side of the machine 10 and is generally used to locate a severed portion of a workpiece for additional cutting and to remove the finished workpiece from the machine 10.

Figure 3:
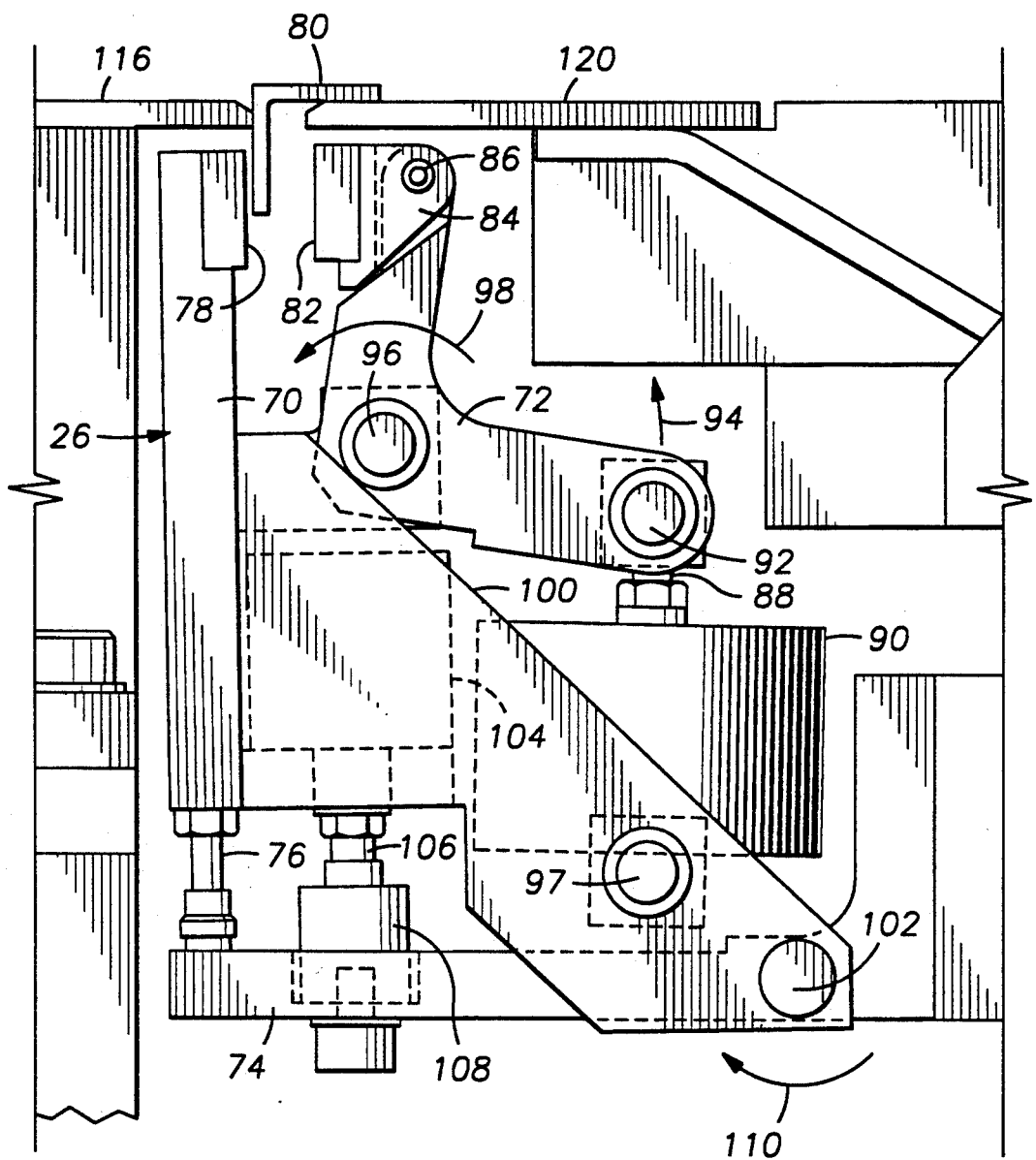
FIG. 3 illustrates a side view of a gripping mechanism and a vise in accordance with the present invention.

FIG. 3 illustrates a detailed side view of the gripper 26. It should be understood that the gripper 26 and the gripper 27 are substantially the same. The gripper 26 includes a stationary arm 70 and a pivotable arm 72 that cooperates with the stationary arm 70. The lower end of the stationary arm 70 is coupled to an adjustable hard stop 76 that abuts against a base 74. The upper end of the stationary arm 70 includes a gripping surface 78 that is positioned to contact the workpiece 80. A complimentary gripping surface 82 is found on a pivotable portion 84 that is coupled to the upper end of the pivotable arm 72 by a pin 86. The lower end of the pivotable arm 72 is pivotally coupled to the piston 88 of a fluidic cylinder, such as an air cylinder 90, by a pin 92. When the piston 88 of the air cylinder 90 extends upwardly generally in the direction of the arrow 94, the upper end of the pivotal arm 72 pivots about the pin 96 generally in the direction of the arrow 98, thus bringing the gripping surface 82 into contact with the workpiece 80 and pinching the workpiece 80 between the gripping surface 82 and the gripping surface 78.

The stationary arm 70, the pin 96, and the pin 97 are mounted on a member 100. The lower end of the member 100 is pivotally mounted to the base 74 by a pin 102. The lower end of the air cylinder 90 is pivotally mounted to the pin 97. A fluidic cylinder, such as an air cylinder 104, is also mounted on the member 100 adjacent the stationery arm 70. The downwardly facing piston 106 of the air cylinder 104 contacts the base 74, or it contacts an adjustment mechanism 108 that extends upwardly therefrom.

Once the workpiece 80 has been gripped between the gripping surfaces 78 and 82, the piston 106 of the air cylinder 104 extends to pivot the arms 70 and 72 about the pivot pin 102 generally in the direction of the arrow 110. This motion has the tendency to lift the workpiece 80 and to move it away from the jaws of the vise. Thereafter, the gripper 26 may be moved along the "X" axis to reposition the workpiece 80.

In the preferred embodiment, the grippers 26 and 27 are generally used to move the workpiece 80 as desired. They are generally not used to grip the workpiece 80 while it is being cut by the saw blade 12. Instead, the machine 10 includes two vises 112 and 114. The vise 114 is positioned on the input side of the machine 10 and is generally used to hold the workpiece 80 while the first cut is being performed. Similarly, the vise 112 is located on the output side of the machine 10 and is generally used to hold the workpiece 80 during subsequent cuts. Each vise 112 and 114 includes a stationery jaw 116 and 118, respectively, and a moveable jaw 120 and 122, respectively. A respective air cylinder 124 and 126 is coupled to each moveable jaw 120 and 122. The cylinders 124 and 126 extend to move the jaws 120 and 122 closer to the jaws 116 and 118 in order to grip the workpiece 80. Likewise, the cylinders 124 and 126 retract to move the jaws 120 and 122 away from the jaws 116 and 118 to release the workpiece 80, so that the grippers 26 and 27 may relocate it.

Figure 31:
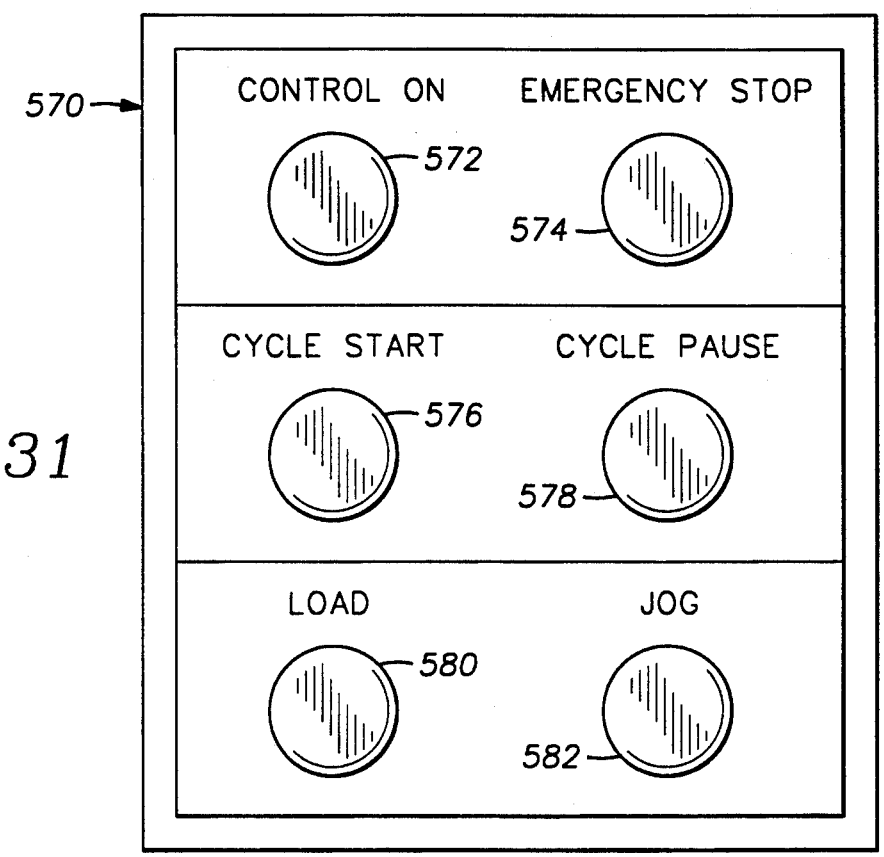
FIG. 31 illustrates a control panel.

The machine 10 also preferably includes additional devices to help an operator load or manipulate the workpiece. As illustrated in FIGS. 2 and 36, a load vise 129, positioned between the guide 60 and the vise 114, is used to hold the workpiece in place during the loading sequence. The load vise 129 is similar to the vises 112 and 114 in that it includes a stationary jaw 133 and a slidable jaw 135. A heavy load clamp 125 is positioned above the load vise 129. The heavy load clamp 125 is vertically moveable and is used to apply force downwardly onto the workpiece. The heavy load clamp 125 is activated by the footswitch 127 or the JOG button 582 (FIG. 31). A light load clamp 131 (partially obscured but virtually identical to the heavy load clamp 125) is positioned above the vise 114. The light load clamp 131 is also vertically moveable and is used to apply force downwardly onto the workpiece. The clamps 125 and 131 generally are used to push the workpiece downwardly into the vises 129 and 114. Preferably, the clamps 125 and 131 include rollers 137 and 139, respectively, which permit some relative horizontal movement between the clamps 125 and 131 and the workpiece. A load stop 141 is preferably positioned adjacent or coupled to the slidable jaw 135 of the load vise 129. The load stop 141 stops the workpiece in a predetermined position during loading.

Referring again to FIG. 1, the machine 10 is preferably controlled by a computer system 120. The computer system 120 preferably includes an IBM compatible personal computer 122, but those skilled in the art will recognize that many computers may be used to control the machine 10. The computer 122 preferably includes an operator input device, such as a keyboard 124. The computer also includes a display 126. The computer system 120 preferably uses a 24 bit parallel I/O board manufactured by Metrabyte, Inc. of 440 Myle Standish Blvd., Taunton, Mass. 02780 as Model No. PIO-12. The computer system 120 and the machine 10 communicate with each other via a bus located in the conduit 128.

Figures 1, 4A:
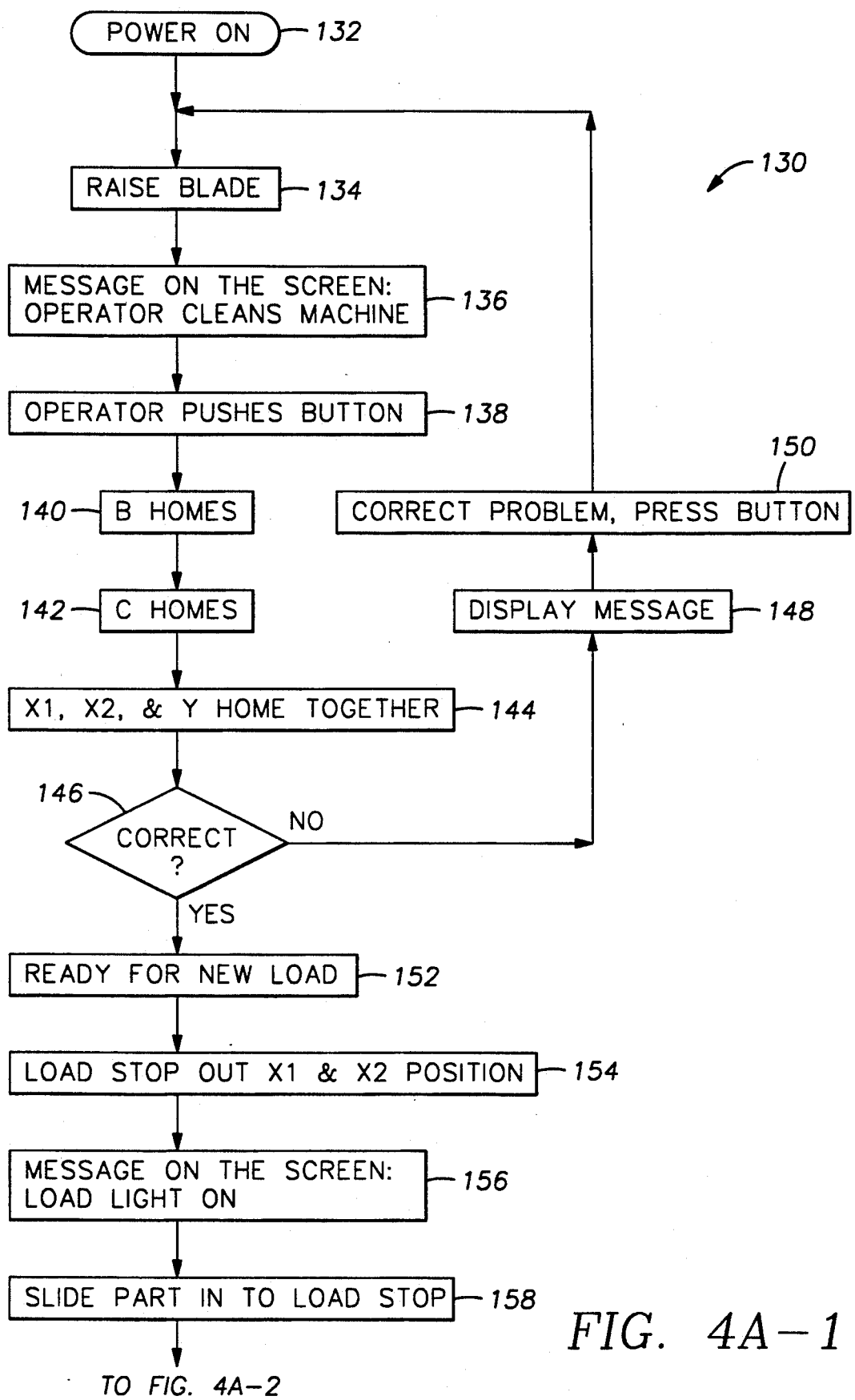
Figures 2, 4A:
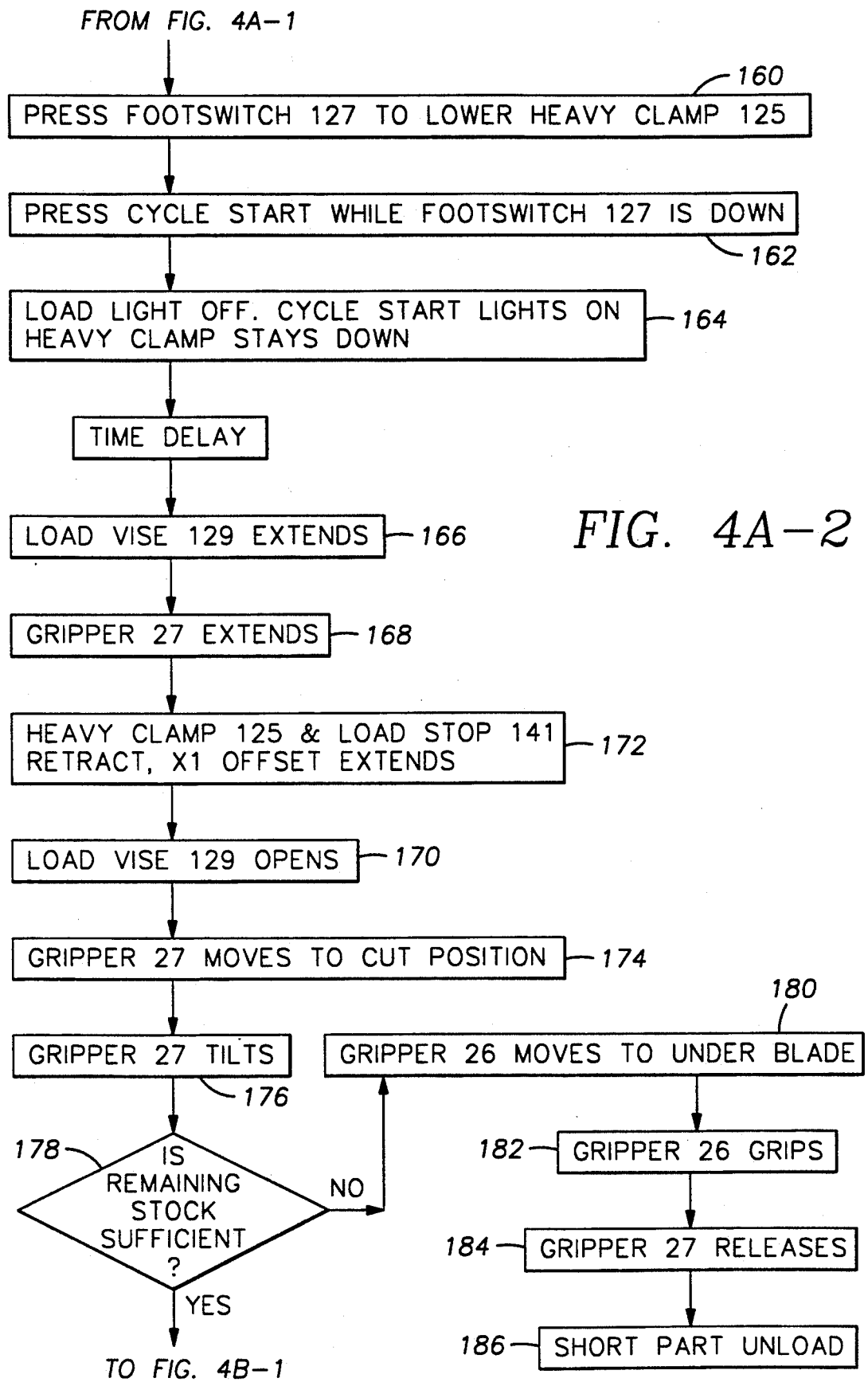
Figures 1, 4B:
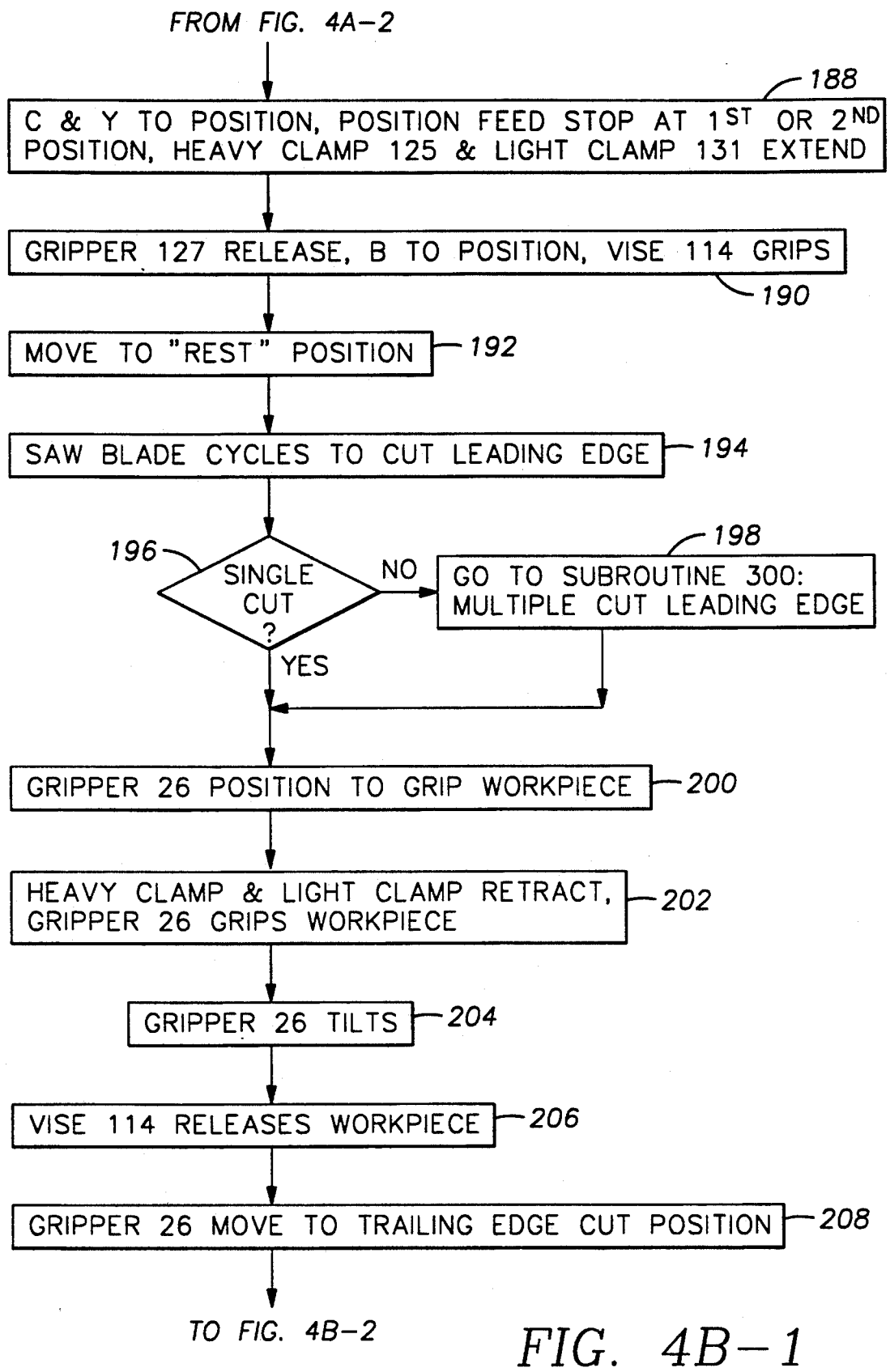
Figures 2, 4B:
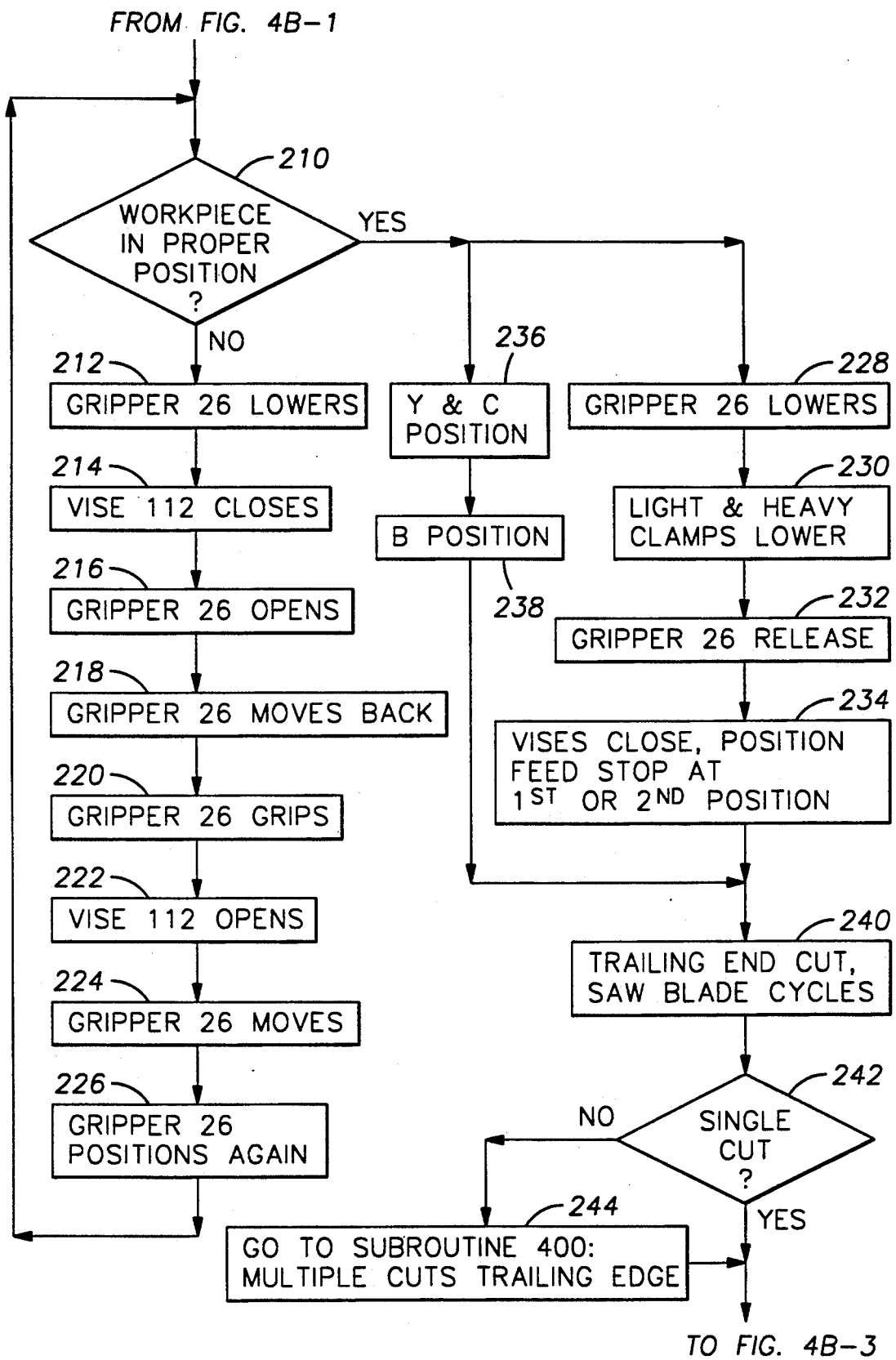
Figures 3, 4B:
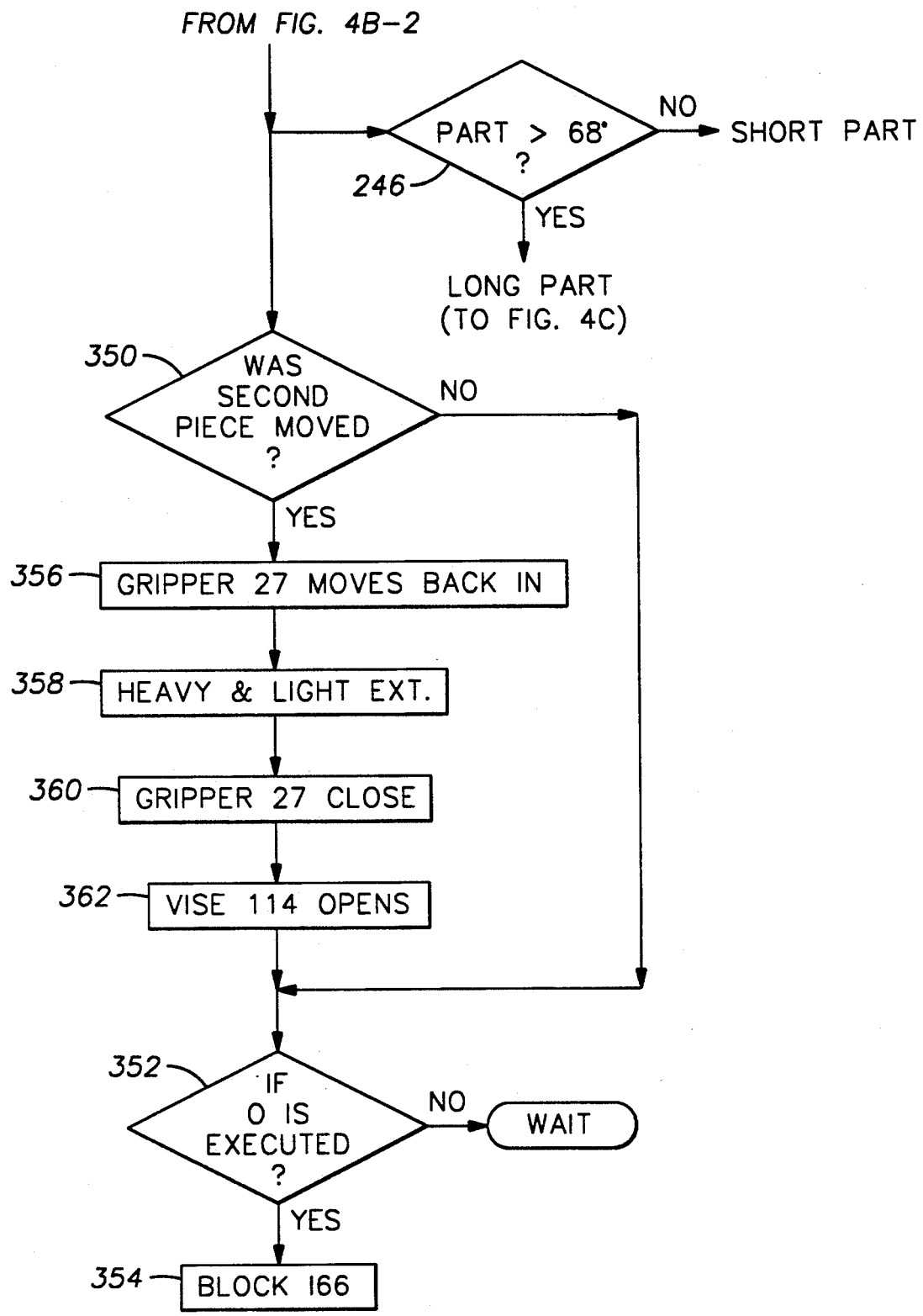
Figure 4C:
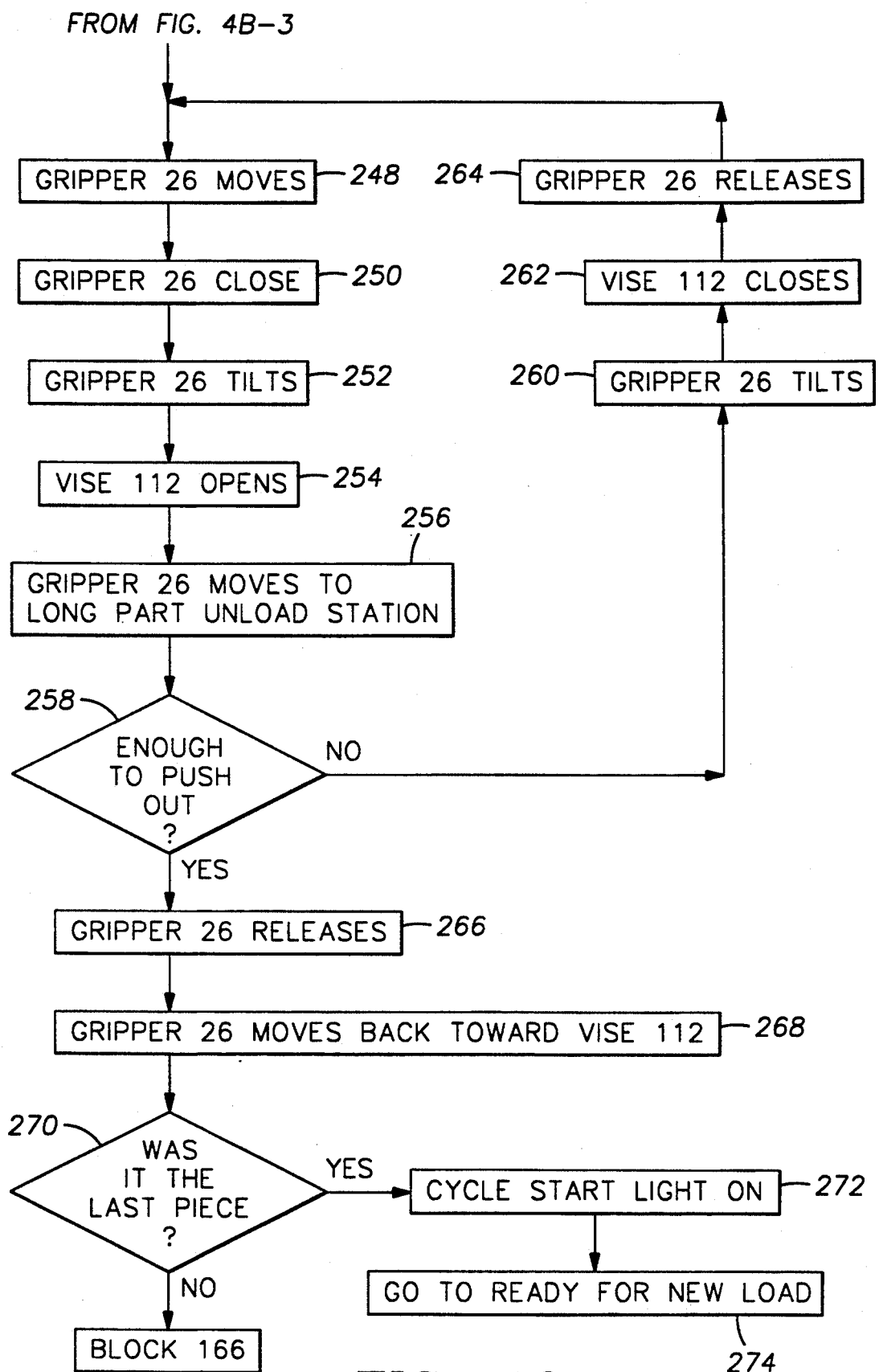

The operation of the computer system 120 and the way it interacts with the rest of the machine 10 is described in reference to the flowchart 130 illustrated in FIGS. 4A, 4B, and 4C. First, the operator turns the machine 10 on. (Block 132). Once activated, the computer system 120 directs the machine 10 to raise the blade 12 and to open the vises 112 and 114 and the grippers 26 and 27. (Block 134). A message is sent to the display 126 to prompt the operator to clean the machine 10. (Block 136). Once accomplished, the operator pushes a button, and the computer system 120 proceeds to position the saw in a home position with respect to the "B" axis, the "C" axis, and the "Y" axis. (Blocks 138, 140, 142, and 144). Also, the grippers 26 and 27 are positioned along the "X" axis as designated by the positions X1 and X2. (Block 144).

These home positions are then checked for accuracy. (Block 146). If the positions are incorrect for some reason, the system 120 displays a message to the operator. (Block 148). Once the problem has been corrected, the operator pushes a button and control transfers back to block 134. (Block 150). However, if the machine 10 has been homed properly, the machine 10 is ready to receive a new load or workpiece. (Block 152).

The operator loads the machine 10, and the display 126 indicates that the machine 10 is being loaded. (Blocks 154 and 156). After the workpiece has been properly inserted, e.g., when the end of the workpiece abuts the load stop 141, the operator presses the footswitch 127 to lower the heavy clamp 125 onto the workpiece. (Blocks 158 and 160). The operator presses the CYCLE START button 576 (FIG. 31) while the footswitch 127 is engaged. (Block 162). The computer system indicates the switch from the "load" status to the "cycle start" status, and the heavy clamp 125 stays down. (Block 164). After a predetermined delay, the load vise 129 and the gripper 27 secure the workpiece. (Blocks 166 and 168). Then, the load vise 129 opens and the heavy clamp 125 and load stop 141 retract, leaving the gripper 27 in control of the workpiece. (Blocks 170 and 172). Then, the gripper 27 tilts upwardly and moves along the "X" axis to position the workpiece under the saw blade 12. Once in position, the gripper 27 tilts downwardly to position the workpiece within the open vise 114. (Block 174).

Before the first cut takes place, the computer system 120 determines whether the remaining stock of the workpiece is sufficient to begin the cutting operation (block 178). If not, the gripper 26 moves under the saw blade 12. (Block 180). The gripper 26 grips the workpiece, and the gripper 27 releases the workpiece. (Blocks 182 and 184). Thus, the gripper 26 controls the workpiece and removes the workpiece from the machine 10 because the workpiece is of insufficient size to be processed. (Block 186).

If the remaining length of the workpiece is sufficient to perform cutting operations, the "Y" and "C" axis positions are pivoted to the desired positions, the feed stop is positioned, and the heavy and the light clamps 125 and 131 lower to maintain downward force on the workpiece. (Block 188). The gripper 27 releases the workpiece and the vise 114 grips the workpiece. (Block 190). Then, the gripper 27 moves to a "rest" position and the saw blade 12 cycles to cut the leading edge of the workpiece as desired. (Blocks 192 and 194).

Figure 5:
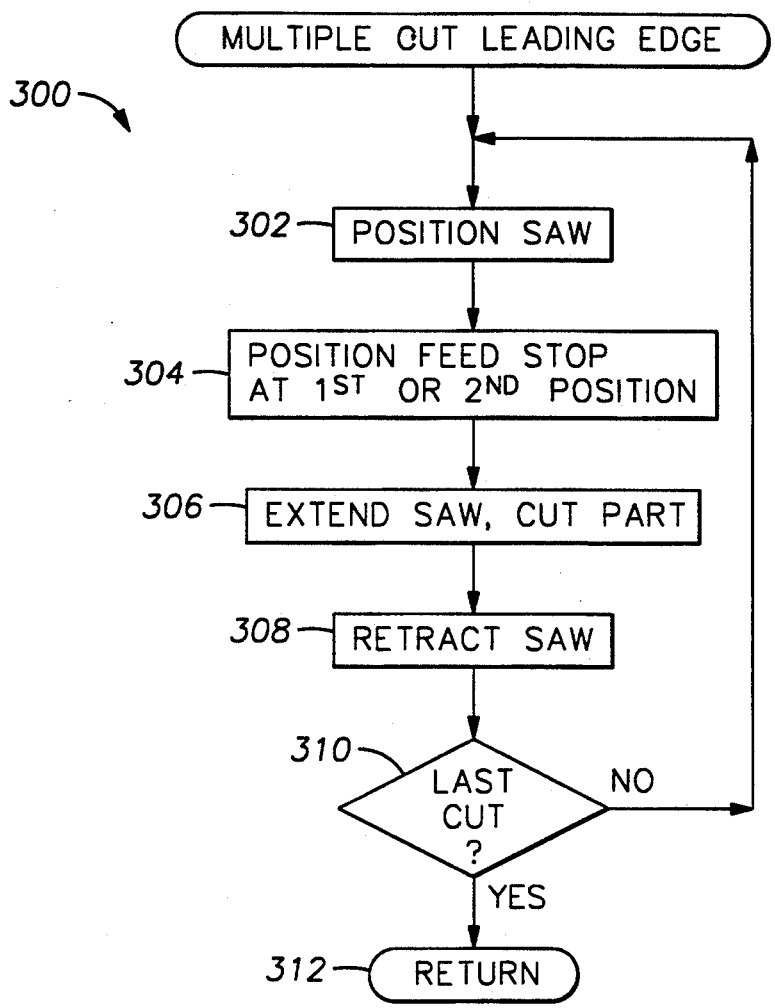
FIG. 5 illustrates a flowchart describing a subroutine for making multiple cuts to a leading edge of a workpiece.

If the leading edge of the workpiece is to receive more than a single cut, control transfers to an appropriate subroutine set forth in the flowchart 300 illustrated in FIG. 5. (Blocks 196 and 198). In this subroutine, the saw is positioned in its desired position about the appropriate axes. (Block 302). The feed stop is now positioned in a first or second position to limit the downward movement of the arm 30 during cutting, if desired. (Block 304). Then, the saw is lowered onto the workpiece to cut it. (Block 306). After the cut is made, the saw is retracted. (Block 308). If the leading edge requires even further cuts, these steps are essentially repeated. (Block 310). If not, control transfers back to the main program. (Block 312).

After the subroutine transfers control back to the main program, or if the leading edge requires only a single cut, the gripper 26 moves into position to grip the leading edge of the workpiece. (Block 200). The heavy clamp and light clamp retract, and the gripper 26 grasps the leading edge of the workpiece. (Block 202). Then, the gripper 26 tilts the workpiece upwardly as the vise 114 releases its grip on the workpiece. (Blocks 204 and 206). Thus released, the gripper 26 may now move along the "X" axis and draw the workpiece along the elongated portion 18 of the table 17 so that its trailing edge may be cut. (Block 208).

In some situations, for instance where the part being machined is rather long, the gripper 26 may not be able to accurately position the part using a single movement. Therefore, the computer system 120 determines whether the trailing edge of the workpiece is in the proper position. (Block 210). If not, the gripper 26 lowers the workpiece and the vise 112 closes to hold the workpiece steady. (Blocks 212 and 214). Then, the gripper 26 opens and moves back along the "X" axis toward the saw until it is positioned to again grip the workpiece and move it further along the elongated portion 18 of the table 17. (Blocks 216 and 218). When the gripper 26 reaches the desired position, it again grips the workpiece, and the vise 112 opens to allow the gripper 26 to move the workpiece. (Blocks 220, 222, and 224). The gripper 26 moves the workpiece until it reaches a predetermined position on the elongated portion 18 of the table 17. (Block 226). With the gripper 26 having completed its second movement, the computer system 120 again determines whether the trailing edge of the workpiece is in the desired position. (Block 210). If not, the gripper 26 simply repeats this process until the trailing edge of the workpiece is in its desired position. (Blocks 212-226). Hence, the machine 10 may cut the workpiece to any length desired.

Once the trailing edge of the workpiece reaches its desired position, the gripper 26 lowers the workpiece into the open vise 112, and the heavy and light clamps lower to make sure that the workpiece is forced down into the vise 112. Then, the vise 112, and if necessary the vise 114, closes to grip the workpiece so that its trailing edge may be cut by the saw blade 12. (Blocks 228-234). At the same time, the saw is positioned relative to the "B", "C", and "Y" axes. (Blocks 236 and 238). The gripper opens and moves to its rest position. Then, with the saw being in the proper position, the feed stop being set, and the workpiece being firmly secured by the vise 112, the saw blade 12 is lowered to cut the trailing edge of the workpiece as desired. (Block 240).

Figure 6:
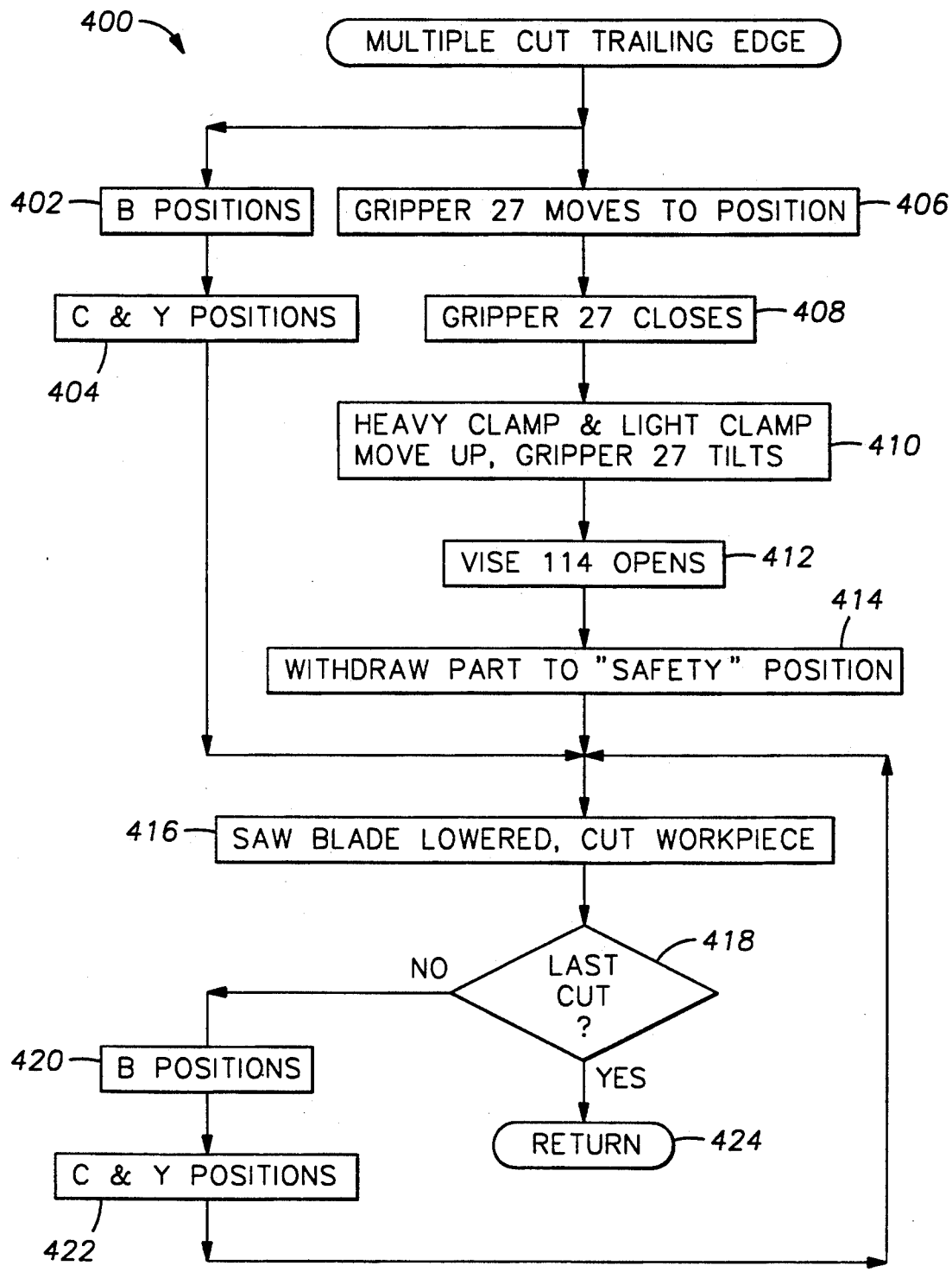
FIG. 6 illustrates a flowchart describing a subroutine for making multiple cuts to the trailing edge of a workpiece.

Now the computer system 120 determines whether the trailing edge has been finished by this single cut or whether one or more additional cuts are required. (Block 242). If more cuts are required, control transfers to a subroutine illustrated in the flowchart 400 of FIG. 6. (Block 244). Here, the saw is positioned about the "B", "C", and "Y" axes for the next cut. (Blocks 402 and 404). Also, if the next workpiece needs to be repositioned, the gripper 27 moves the next workpiece into a new position to avoid the blade as it cuts through the first workpiece. To accomplish this, the gripper 27 positions itself under the next workpiece and closes about the next workpiece. (Blocks 406 and 408). The vise 114 opens, and the heavy and light clamps move upwardly to release the next workpiece. The gripper 27 is tilted to allow it to move the workpiece. (Blocks 410 and 412). The gripper 27 then moves the next workpiece into the appropriate position. (Block 414). Now, the saw blade 12 is lowered to cut the workpiece. (Block 416). If additional cuts are required, the saw is raised and repositioned about the "B", "C", and "Y" axes, and then lowered to make the additional cuts. (Blocks 416, 420, and 422). However, if the last cut has been made, control transfers back to the main program. (Block 424).

Once the single cut or all multiple cuts have been made to the trailing edge of the workpiece, the part classified by the computer as a long part or a short part. (Block 246). If the part is greater than the predetermined length (here shown to be 68 inches), it is classified as a long part. In this situation, as set forth in FIG. 4C, the gripper 26 moves toward the vise 112 and grips the workpiece. (Blocks 248 and 250). The vise 112 opens and the gripper 26 tilts so that the gripper 26 can now move the workpiece to an unloading station for long parts (not shown) which is located under a portion of the elongated portion 18. (Blocks 252, 254, and 256). If the part is too long for this single movement to remove it from the machine 10, the gripper 26 tilts the workpiece back into the vise 112 which closes about the workpiece. (Blocks 260 and 262). Then, the gripper 26 releases the workpiece and moves back toward the vise 112 to repeat the procedure just described. (Blocks 264, and 248-256). Once the long part is in position to be removed, e.g., through the guide 62, the gripper 26 releases it and moves back toward the vise 112. (Blocks 266 and 268).

If this was the last piece to be cut, the computer system 120 turns off the "cycle start" light and signals that it is ready for a new load. (Blocks 270, 272, and 274). If not, control transfers back to block 166 so that the workpiece can be further segmented.

If the part is classified as a short part, the above procedure is essentially repeated, except the part is moved to a different location where other short parts have been unloaded. The gripper 26 grips the part and the vise 112 opens. Then, the gripper 26 tilts the part and moves it along the "X" axis to an unloading station for short parts (not shown). If the short part is still too long to be removed after this single movement, the gripper 26 tilts the part back down into the vise 112 which closes about the part. The gripper 26 releases the part and moves along the "X" axis toward the vise 112. Then, the gripper 26 again grips the part, the vise 112 opens, and the gripper 26 tilts the part up so that it can move the part toward the unloading station. Once the short part has been removed from the machine 10, the computer system 120 determines whether it was the last part of the workpiece to be processed. If it was, the computer system turns off the "cycle start" light and indicates that it is ready to accept a new load. If it was not the last piece, control transfers back to block 166 so that the workpiece can be processed further.

While the workpiece is being unloaded by the gripper 26, the gripper 27 is repositioning the next workpiece that had been moved to avoid the blade when the trailing edge of the preceding workpiece was being cut. If the next workpiece was not moved, the machine waits until the first workpiece has been unloaded and then control transfers to block 166 so that the next workpiece can be processed. (Blocks 350, 352, and 354). If the next workpiece was moved, the gripper 27 moves into position and grips the workpiece, and the vise 114 opens to allow the workpiece to be repositioned. (Blocks 356, 358, 360, and 362).

As a matter of practicality, the operation of the machine 10 will now be described from an operator's viewpoint. After the machine 10 has been powered up, a brief message is shown on the display 126 reminding the operator of initial preparations. Pressing any key from the keyboard 124 will advance the screen to the main menu. The main menu shown on the display 126 is illustrated as screen 500 in FIG. 7.

The respective menu items (1 through 5) shown in the main menu screen 500 allow the operator to step through various machine controls, as will be explained herein. The "status" block shown in the bottom right hand corner on the screen 500 represents the status of the machine 10. For instance, status messages "Emergency Stop" or "Cycle Pause" could appear on the screen 500 in the "status" block.

The operator may program the computer system 120 so that the machine 10 will correctly process a particular type of workpiece. The program data for the machine is typically taken from a sample workpiece. Tools such as a six inch engineering scale, a twelve foot tape measurer, a standard protractor, and the sample workpiece are useful for creating a new workpiece program.

To create a program, the operator uses the keyboard 124 to select item "1" from the main menu screen 500. After item "1" has been selected, the menu screen 502 illustrated in FIG. 8 should appear on the display 126. It should be noted that if the wrong screen appears, the operator may select "Q" and press "Enter" to return to the main menu.

According to the menu screen 502, to create a part program for L-shaped material, the operator will press "1" on the keyboard 124. To create a part program for Z-shaped material, the operator will press "2" on the keyboard 124. Pressing "0" will return the display 126 back to the main menu screen 500.

Since the machine 10 cannot accept all workpieces regardless of size, the sample workpiece should be measured to determine whether it can be processed by the machine 10. Preferably, the operator uses the six inch engineering scale to determine whether the workpiece can be cut on the machine 10. By way of example, an L-shaped sample workpiece 504 and sample dimensions are illustrated in FIG. 9. If the sample workpiece 504 does not meet the dimensional requirements, the machine 10 will not be capable of processing the workpiece. However, if the sample workpiece does meet the dimensional requirements, the operator may press any key on the keyboard 124 to continue. Preferably, the operator enters information into the computer 122 that will allow the computer 122 to store the new program for future reference. This type of information may include a part number of the sample workpiece, a serial number of a processing tool, and the operator's initials. Preferably, the computer 112 searches its files to avoid recreating the same program as one previously stored.

Once the operator enters the identifying information, if any, the menu screen 510 illustrated in FIG. 10 will appear on the display 126. Next, the operator should hold the sample workpiece as if loading it into the machine 10. The lower leg 506 is typically considered to be the portion of the workpiece 504 that will be held within the vises 112 and 114. If the operator wants the leading portion of the lower leg 506 of the sample workpiece 504 to be cut straight, i.e., a 90° degree cut as illustrated by the workpiece in FIG. 11, the operator will press "1" on the keyboard 124. If the operator wants the leading portion of the lower leg 506 of the sample workpiece 504 to be cut at an angle of less than 90° degrees, as illustrated by the workpiece in FIG. 12, the operator will press "2" on the keyboard 124 and, then, enter the desired angle. If the operator wants the leading portion of the lower leg 506 of the sample workpiece 504 to be cut at an angle of greater than 90° degrees, as illustrated by the workpiece in FIG. 13, the operator will press "3" on the keyboard 124 and, then, enter the desired angle. It should be noted that the angle at which the lower leg 506 will be cut is determined by the orientation of the saw about the "B" axis. In the preferred embodiment, the saw may be tilted by no more than 50° degrees to either side of the center position. Thus, the angle at which the lower leg 506 may be cut would range from 40° degrees to 140° degrees.

Once the operator has selected the angle at which the machine 10 will cut each leading edge of the workpiece, the operator will select the angle at which each trailing edge of the workpiece will be cut. Preferably, the computer 122 delivers the menu screen 512 illustrated in FIG. 14 to the display 126 to assist the operator. If the operator wants the trailing portion of the lower leg 506 of the sample workpiece 504 to be cut straight, i.e., a 90° degree cut as illustrated by the workpiece in FIG. 15, the operator will press "1" on the keyboard 124. If the operator wants the trailing portion of the lower leg 506 of the sample workpiece 504 to be cut at an angle of less than 90° degrees, as illustrated by the workpiece in FIG. 16, the operator will press "2" on the keyboard 124 and, then, enter the desired angle. If the operator wants the trailing portion of the lower leg 506 of the sample workpiece 504 to be cut at an angle of greater than 90° degrees, as illustrated by the workpiece in FIG. 17, the operator will press "3" on the keyboard 124 and, then, enter the desired angle.

Figure 19:
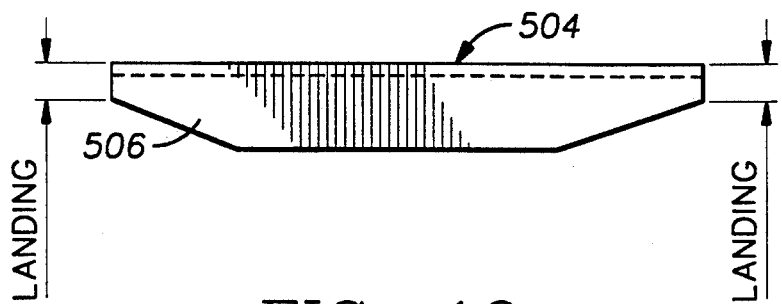
FIG. 19 illustrates a top view of an L-shaped workpiece.
Figure 20:
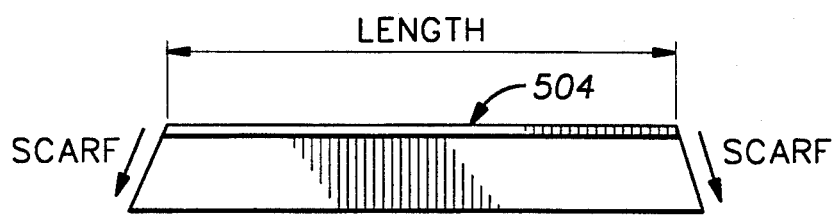
FIG. 20 illustrates a bottom view of an L-shaped workpiece.

The next screen 514, illustrated in FIG. 18, requests information relating to the "Landing" or "Surface Base Offset" for the workpiece 504, as illustrated in FIG. 19. This information includes the "Landing" dimensions for the leading and trailing edges of the workpiece 504, and the length of the workpiece 504. The "Landing" is determined along the "Y" axis plane. It is measured from the outside edge of the lower leg 506 to the bottom surface break point or "scarf," as illustrated in FIG. 20. When measuring the length of the sample workpiece 504, the operator will typically use the standard 12 foot tape measurer. The length of the sample workpiece 504 is considered to be the distance from one end of the bottom base surface to the other. The length of the lower leg is the distance from the bottom base surface to the bottom lower leg edge.

Once the operator has entered this information, a new workpiece program has been loaded into the computer. The operator may elect to save the program, or, if a mistake has been made, the operator may elect not to save the program and start over.

Figure 21:
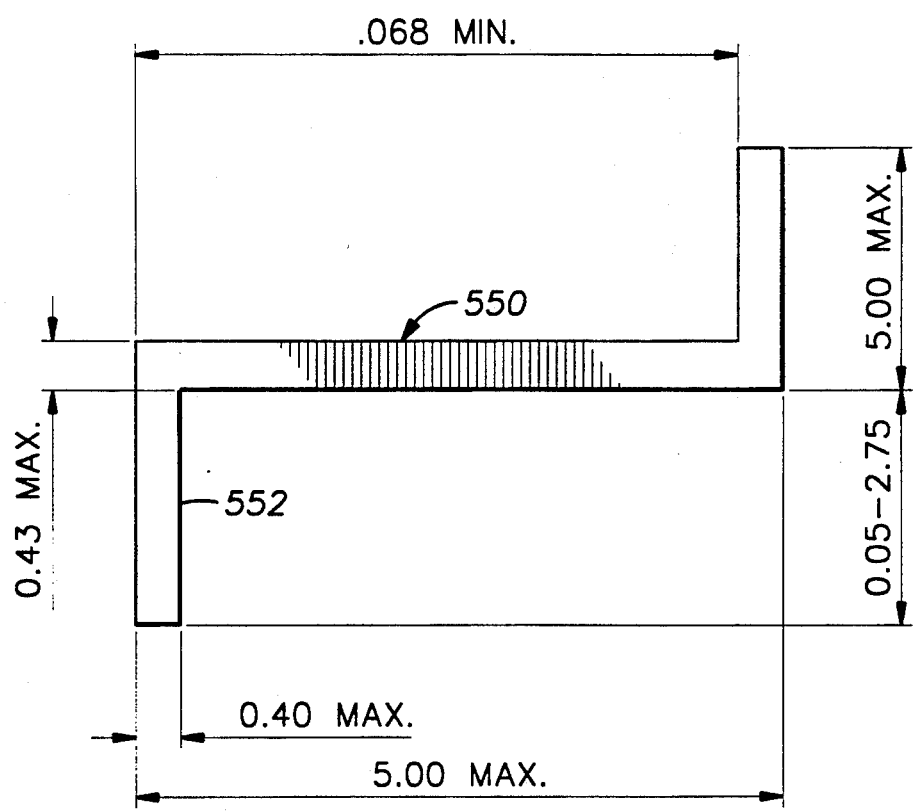
FIG. 21 illustrates an end view of a Z-shaped workpiece.

An operator may also program the computer 122 to cut a Z-shaped workpiece by pressing "2" in the menu screen 502. As with the L-shaped workpiece 504, the sample Z-shaped workpiece should be measured to determine whether it can be processed by the machine 10. Preferably, the operator uses the six inch engineering scale to determine whether the workpiece can be cut on the machine 10. By way of example, an Z-shaped sample workpiece 550 and sample dimensions are illustrated in FIG. 21. If the sample workpiece 550 does not meet the dimensional requirements, the machine 10 will not be capable of processing the workpiece. However, if the sample workpiece 550 does meet the dimensional requirements, the operator may press any key on the keyboard 124 to continue. Preferably, the operator now enters information into the computer 122 that will allow the computer 122 to store the new program for future reference. This type of information may include a part number of the sample workpiece, a serial number of a processing tool, and the operator's initials.

Figure 22:
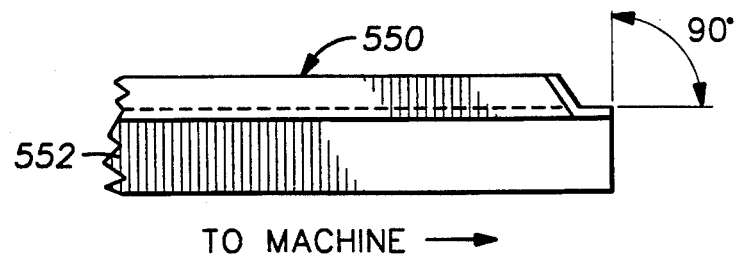
FIG. 22 illustrates a leading edge portion of a Z-shaped workpiece having a 90° degree cut.
Figure 23:
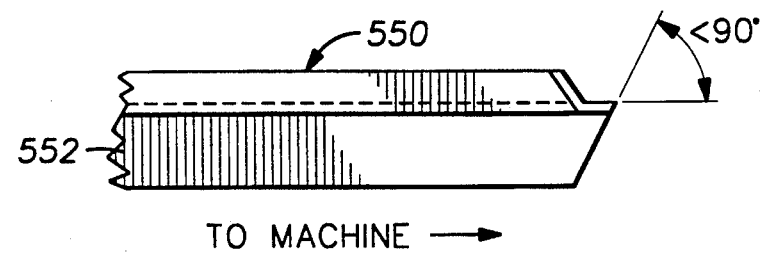
FIG. 23 illustrates a leading edge portion of a Z-shaped workpiece having a cut less than 90° degrees.
Figure 24:
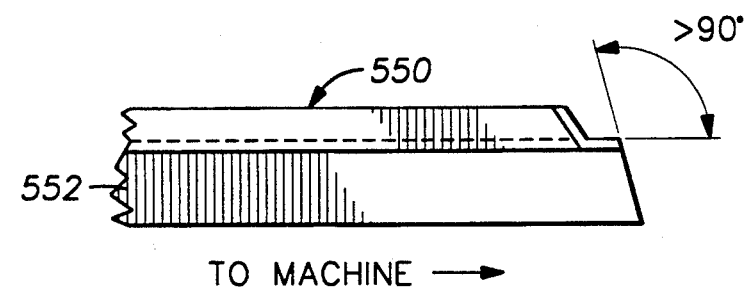
FIG. 24 illustrates a leading edge portion of a Z-shaped workpiece having a cut greater than 90° degrees.

Once the operator enters the identifying information, if any, the menu screen 510 illustrated in FIG. 10 will appear on the display 126. Next, the operator should hold the sample workpiece as if loading it into the machine 10. The lower leg 552 is typically considered to be the portion of the workpiece 550 that will be held within the vises 112 and 114. If the operator wants the leading portion of the lower leg 552 of the sample workpiece 550 to be cut straight, i.e., a 90° degree cut as illustrated by the workpiece in FIG. 22, the operator will press "1" on the keyboard 124. If the operator wants the leading portion of the lower leg 552 of the sample workpiece 550 to be cut at an angle of less than 90° degrees, as illustrated by the workpiece in FIG. 23, the operator will press 11211 on the keyboard 124 and, then, enter the desired angle. If the operator wants the leading portion of the lower leg 552 of the sample workpiece 550 to be cut at an angle of greater than 90° degrees, as illustrated by the workpiece in FIG. 24, the operator will press "3" on the keyboard 124 and, then, enter the desired angle. As with the L-shaped workpiece 504 described previously, the angle at which the lower leg 552 will be cut is determined by the orientation of the saw about the "B" axis. Thus, in the preferred embodiment, the angle at which the lower leg 552 may be cut would range from 40° degrees to 140° degrees.

Figure 25:
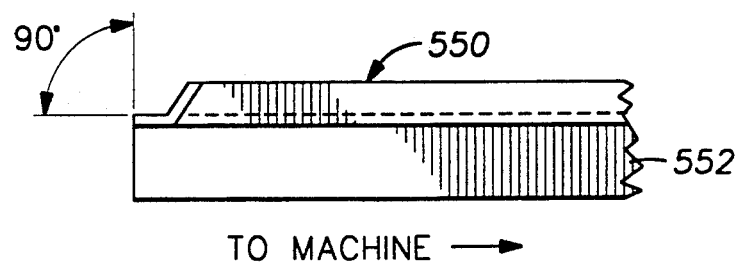
FIG. 25 illustrates a trailing edge portion of a Z-shaped workpiece having a cut of 90° degrees.
Figure 26:
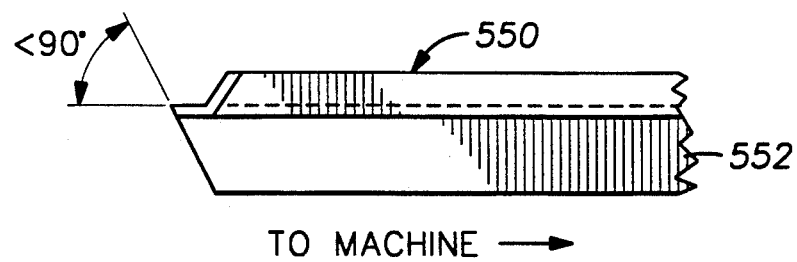
FIG. 26 illustrates a trailing edge portion of a Z-shaped workpiece having a cut of less than 90° degrees.
Figure 27:
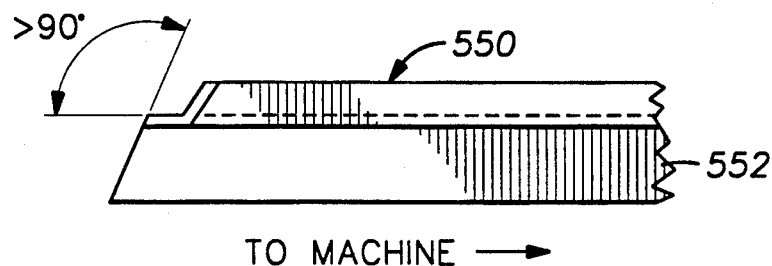
FIG. 27 illustrates a trailing edge portion of a Z-shaped workpiece having a cut of greater than 90° degrees.

Once the operator has selected the angle at which the machine 10 will cut each leading edge of the workpiece 550, the operator will select the angle at which each trailing edge of the workpiece 550 will be cut. Preferably, the computer 122 delivers the menu screen 512 illustrated in FIG. 14 to the display 126 to assist the operator. If the operator wants the trailing portion of the lower leg 552 of the sample workpiece 550 to be cut straight, i.e., a 90° degree cut as illustrated by the workpiece in FIG. 25, the operator will press "1" on the keyboard 124. If the operator wants the trailing portion of the lower leg 552 of the sample workpiece 550 to be cut at an angle of less than 90° degrees, as illustrated by the workpiece in FIG. 26, the operator will press "2" on the keyboard 124 and, then, enter the desired angle. If the operator wants the trailing portion of the lower leg 552 of the sample workpiece 550 to be cut at an angle of greater than 90° degrees, as illustrated by the workpiece in FIG. 27, the operator will press "3" on the keyboard 124 and, then, enter the desired angle.

Figure 28:
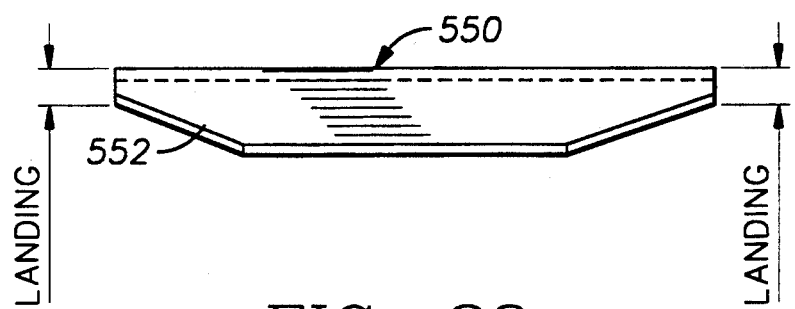
FIG. 28 illustrates a top view of a Z-shaped workpiece.
Figure 29:
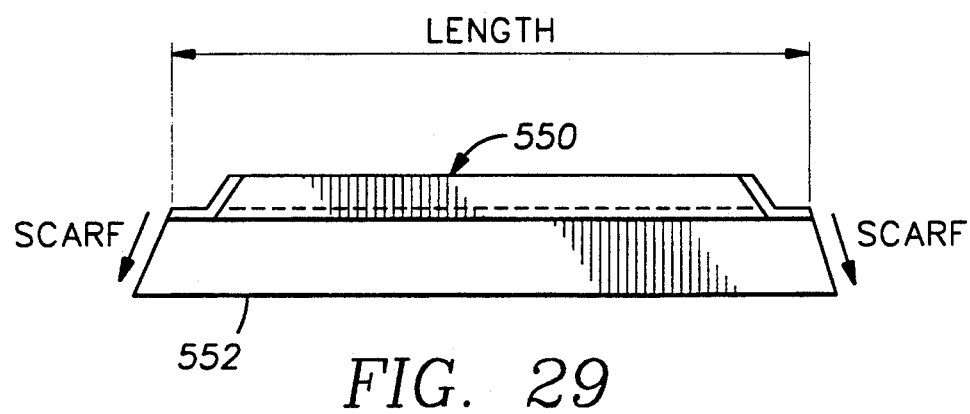
FIG. 29 illustrates a bottom view of a Z-shaped workpiece.

The next screen 514, illustrated in FIG. 18, requests information relating to the "Landing" or "Surface Base Offset" for the workpiece 550, as illustrated in FIG. 28. This information includes the "Landing" dimensions for the leading and trailing edges of the workpiece 550, and the length of the workpiece 550. The "Landing" is determined along the "Y" axis plane. It is measured from the outside edge of the lower leg 552 to the bottom surface break point or "scarf," as illustrated in FIG. 29. When measuring the length of the sample workpiece 550, the operator will typically use the standard 12 foot tape measurer. The length of the sample workpiece 550 is considered to be the distance from one end of the bottom base surface to the other. The length of the lower leg 552 is the distance from the bottom base surface to the bottom lower leg edge.

Once the operator has entered this information, a new workpiece program has been loaded into the computer. The operator may elect to save the program, or, if a mistake has been made, the operator may elect not to save the program and start over.

Figure 30:
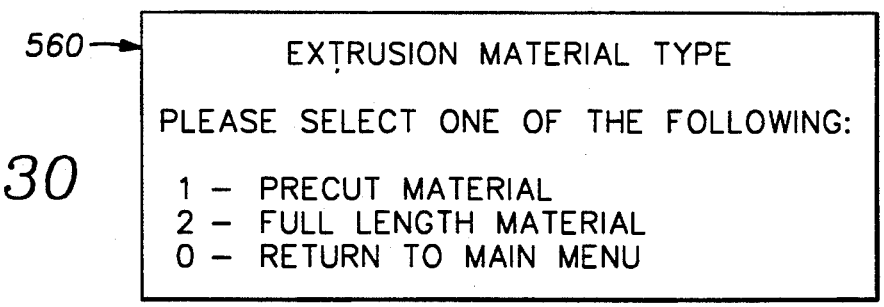
FIG. 30 illustrates a menu screen.

To run a workpiece program stored in the computer 122, the operator returns to the main menu screen 500 and enters "2" on the keyboard 124. Then, the menu screen 560 illustrated in FIG. 30 appears on the display 126. To run precut workpieces through the machine 10 for additional processing, the operator selects menu option "1" on the screen 560. Next, the operator recalls the appropriate workpiece program and enters the number of workpieces that will be run through the machine 10.

The machine 10 will now begin to run through the sequence described with reference to the flowchart 130. However, it should be appreciated that this sequence may be interrupted or partially controlled by the operator. To this end, the machine 10 preferably includes an operator control panel 570, as illustrated in FIG. 31. The control panel 570 preferably includes an "ON" switch 572, an "EMERGENCY STOP" switch 574, a "CYCLE START" switch 576, a "CYCLE PAUSE" switch 578, a "LOAD" switch 580, and a "JOG" switch 582.

To run the precut parts, the operator should assure that the machine 10 is not in the CYCLE PAUSE condition. Then, the operator slides the first workpiece into the load vise until the front edge of the workpiece touches the load stop. The operator may use the footswitch or JOG button to clamp the workpiece in place until the CYCLE START button has been pushed. Typically, while holding the footswitch down, the operator will press the CYCLE START button 576 to begin the cutting sequence. The machine 10 will reposition itself for the next workpiece after each processed workpiece has dropped into the appropriate unloading station. When the LOAD READY status appears, these steps are repeated until all precut workpieces have been processed.

The following steps should be executed when cutting a long workpiece, such as when many parts are being cut from a long piece of extruded stock. From the menu screen 560, the operator selects menu option "2." Next, the operator recalls the appropriate workpiece program, enters the length of the workpiece, enters the post-cutting length of the sample workpiece, and enters the number of workpieces to be cut from the piece of stock.

The machine 10 will now begin to run through the sequence described with reference to the flowchart 130, and exhibit a LOAD READY status. To run the precut parts, the operator should assure that the machine 10 is not in the CYCLE PAUSE condition. The operator positions the long piece of stock at the input side of the machine 10 on the appropriate number of roller stands 20. Then, the operator slides the workpiece into the load vise until the front edge of the workpiece touches the load stop. The operator may use the footswitch or JOG button to clamp the workpiece in place until the CYCLE START button has been pushed. Typically, while holding the footswitch down, the operator will press the CYCLE START button 576 to begin the cutting sequence. The machine 10 will continue drawing and cutting the stock until it cuts the desired number of pieces from the stock. If another piece of stock is needed to complete the desired number of parts, the computer will display its readiness to accept another piece of stock.

Figure 32:
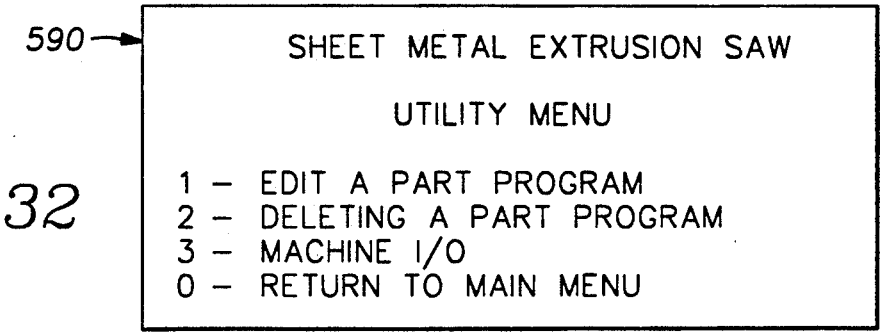
FIG. 32 illustrates a utility menu screen.

A separate file handling menu, illustrated as the Utility Menu screen 590 in FIG. 32, is preferably included so that an operator can edit part programs stored in the computer, delete part programs stored in the computer, and run input/output maintenance on the machine 10. To edit a stored program, the software contains a part program editor. This editor may be used for making changes to both degrees and distance moves within a part program, and preferably contains online help screens to assist the operator in part editing.

Figure 33:
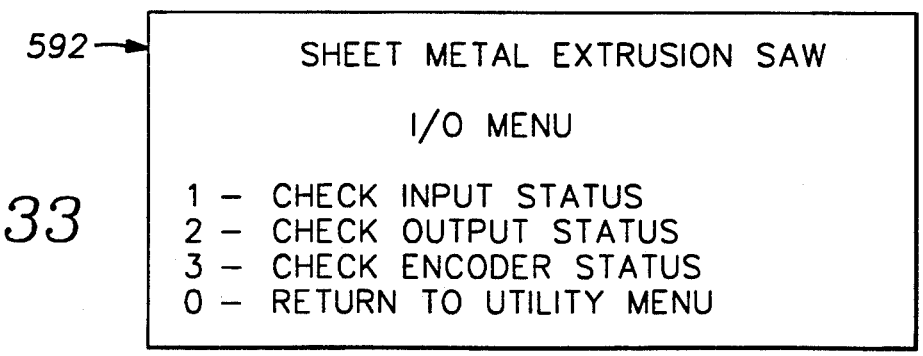
FIG. 33 illustrates an input/output menu screen.

The "Machine I/O" selection on the screen 590 is typically only used by trained maintenance personnel. When the Machine I/O menu item is selected, information regarding the boards within the computer is displayed. For instance, when item "3" on the screen 590 is selected, the menu screen 592 illustrated in FIG. 33 appears on the display 126. Item "1" on the screen 592 is selected to observe the status of all machine inputs, as illustrated on the screen 594 of FIG. 34. The screen will display the active position of the vises, the grippers, the clamps, and the saw motor. Item "2" on the screen 592 is selected to control various elements of the machine 10. As illustrated by the screen 596 of FIG. 35, each of the listed elements can be controlled by entering the appropriate number.

We claim:

1. A method of processing an elongated workpiece using a processing machine, said processing machine comprising:

a frame;

a first gripping mechanism coupled to said frame and being controllably moveable on said frame along a first predetermined path, said first gripping mechanism having an openable and closeable jaw being positioned to respectively release and grip said workpiece;

a second gripping mechanism coupled to said frame in spaced apart relation to said first gripping mechanism and being controllably moveable on said frame along a second predetermined path, said second gripping mechanism having an openable and closeable jaw being positioned to respectively release and grip said workpiece;

a first vise coupled to said frame, said first vise having an openable and closeable jaw being positioned to respectively release and grip said workpiece;

a second vise coupled to said frame in spaced apart relation to said first vise, said second vise having an openable and closeable jaw being positioned to respectively release and grip said workpiece; and a processing mechanism coupled to said frame in a predetermined relation to said first vise and said second vise, said method comprising the following steps performed in order;

(a) closing said jaw of said first gripping mechanism about said workpiece to grip said workpiece;

(b) moving said first gripping mechanism along said first predetermined path to position said workpiece at a first predetermined position;

(c) closing said jaw of said first vise about said workpiece to grip said workpiece;

(d) opening said jaw of said first gripping mechanism to release said workpiece;

(e) processing said workpiece using said processing mechanism;

(f) closing said jaw of said second gripping mechanism about said workpiece to grip said workpiece;

(g) opening said jaw of said first vise to release said workpiece;

(h) moving said second gripping mechanism along said second predetermined path to position said workpiece at a second predetermined position;

(i) closing said jaw of said second vise about said workpiece to grip said workpiece;

(j) processing said workpiece using said processing mechanism;

(k) opening said jaw of said second vise to release said workpiece; and (l) moving said second gripping mechanism along said second predetermined path to expel said workpiece from said machine.

2. The method, as set forth in claim 1, wherein step (b) comprises the step of:

moving said jaw of said first gripping mechanism upwardly to lift said workpiece.

3. The method, as set forth in claim 2, wherein step (c) comprises the step of:

moving said jaw of said first gripping mechanism downwardly to position the workpiece in said first vise.

4. The method, as set forth in claim 1, wherein said first gripping mechanism comprises:

a base being coupled to said frame and being controllably moveable on said frame;

a first arm having an upper end portion and a lower end portion, said lower end portion of said first arm being coupled to said base and said upper end portion of said first arm extending upwardly from said base;

a member having a first end portion and a second end portion, said first end portion of said member being coupled to said first arm and said second end portion of said member being pivotally coupled to said base;

a second arm having an upper end portion and a lower end portion, said second arm being pivotally coupled to said member between said upper end portion and said lower end portion of said second arm, said upper end portion of said second arm being disposed adjacent said upper end portion of said first arm;

a first fluidic cylinder having a upper end portion and a lower end portion and being extendable and retractable, said lower end portion of said first fluidic cylinder being coupled to said member and said upper end portion of said first fluidic cylinder being coupled to said lower end portion of said second arm, so that extension of said first fluidic cylinder pivots said second arm to move said upper end portion of said second arm closer to said upper end portion of said first arm and retraction of said first fluidic cylinder pivots said second arm to move said upper end portion of said second arm farther from said upper end portion of said first arm; and a second fluidic cylinder having a upper end portion and a lower end portion and being extendable and retractable, said lower end portion of said second fluidic cylinder being coupled to said base and said upper end portion of said second fluidic cylinder being coupled to said lower end portion of said first arm, so that extension of said second fluidic cylinder pivots said member to move said upper end portions of said first and second arms upwardly and retraction of said second fluidic cylinder pivots said member to move said upper end portions of said first and second arms downwardly; and wherein step (a) further comprises the step of:
extending said first fluidic cylinder.

5. The method, as set forth in claim 4, wherein step (b) comprises the step of:

extending said second fluidic cylinder.

6. The method, as set forth in claim 5, wherein step (c) comprises the step of:

retracting said second fluidic cylinder.

7. The method, as set forth in claim 4, wherein step (d) comprises the step of:
retracting said first fluidic cylinder.

8. The method, as set forth in claim 1, further comprising, after step (d), the step of:
moving said first gripping mechanism to a predetermined rest position.

9. The method, as set forth in claim 1, wherein said processing mechanism comprises a saw and a multi-axis mounting coupled to said saw, said mounting being moveable about a plurality of axes and wherein each of the steps (e) and (j) comprise the steps of:
selectively controlling said multi-axis mounting to position said saw in a selected orientation relative to said workpiece; and
advancing said saw to cut said workpiece.

10. The method, as set forth in claim 1, wherein step (h) comprises the step of:
moving said jaw of said second gripping mechanism upwardly to lift said workpiece.

11. The method, as set forth in claim 10, wherein step (i) comprises the step of:
moving said jaw of said second gripping mechanism downwardly to position the workpiece in said second vise.

12. The method, as set forth in claim 1, wherein said second gripping mechanism comprises:
a base being coupled to said frame and being controllably moveable on said frame;
a first arm having an upper end portion and a lower end portion, said lower end portion of said first arm being coupled to said base and said upper end portion of said first arm extending upwardly from said base;
a member having a first end portion and a second end portion, said first end portion of said member being coupled to said first arm and said second end portion of said member being pivotally coupled to said base;
a second arm having an upper end portion and a lower end portion, said second arm being pivotally coupled to said member between said upper end portion and said lower end portion of said second arm, said upper end portion of said second arm being disposed adjacent said upper end portion of said first arm;
a first fluidic cylinder having a upper end portion and a lower end portion and being extendable and retractable, said lower end portion of said first fluidic cylinder being coupled to said member and said upper end portion of said first fluidic cylinder being coupled to said lower end portion of said second arm, so that extension of said first fluidic cylinder pivots said second arm to move said upper end portion of said second arm closer to said upper end portion of said first arm and retraction of said first fluidic cylinder pivots said second arm to move said upper end portion of said second arm farther from said upper end portion of said first arm; and
a second fluidic cylinder having a upper end portion and a lower end portion and being extendable and retractable, said lower end portion of said second fluidic cylinder being coupled to said base and said upper end portion of said second fluidic cylinder being coupled to said lower end portion of said first arm, so that extension of said second fluidic cylinder pivots said member to move said upper end portions of said first and second arms upwardly and retraction of said second fluidic cylinder pivots said member to move said upper end portions of said first and second arms downwardly; and
wherein step (f) further comprises the step of:
extending said first fluidic cylinder.

13. The method, as set forth in claim 12, wherein step (h) comprises the step of:
extending said second fluidic cylinder.

14. The method, as set forth in claim 13, wherein step (i) comprises the step of:
retracting said second fluidic cylinder.

15. The method, as set forth in claim 1, further comprising, after step (i), the steps of:
opening said jaw of said second gripping mechanism to release said workpiece; and
moving said second gripping mechanism to a predetermined rest position.

16. The method, as set forth in claim 15, further comprising, after the step (j), the step of:
closing said jaw of said second gripping mechanism about said workpiece to grip said workpiece.

17. The method, as set forth in claim 1, wherein step (l) comprises the steps of:
determining the length of said workpiece being gripped by said second gripping mechanism;
moving said second gripping mechanism to a predetermined location along said second predetermined path; and
opening said jaw of said second gripping mechanism to release said workpiece, thus allowing said workpiece to fall into a station positioned below said predetermined location.

18. A machine for processing an elongated workpiece, said machine comprising:
a frame;
a first gripping mechanism coupled to said frame and being controllably moveable on said frame along a first predetermined path, said first gripping mechanism having an openable and closeable jaw being positioned to respectively release and grip said workpiece;
a second gripping mechanism coupled to said frame in spaced apart relation to said first gripping mechanism and being controllably moveable on said frame along a second predetermined path, said second gripping mechanism having an openable and closeable jaw being positioned to respectively release and grip said workpiece;
a first stationary vise coupled to said frame, said first vise having an openable and closeable jaw being positioned to respectively release and grip said workpiece;
a second stationary vise coupled to said frame in spaced apart relation to said first vise, said second vise having an openable and closeable jaw being positioned to respectively release and grip said workpiece;
wherein each of said first and second vises comprise;
stationary jaw portion being rigidly coupled to said frame;
a moveable jaw portion being slidably coupled to said frame opposite said stationary jaw portion; and
a fluidic cylinder having a first end portion and a second end portion and being extendable and retractable, said first end portion of said fluidic cylinder being coupled to said frame and said second end portion of said fluidic cylinder being coupled to said moveable jaw portion, so that extension of said fluidic cylinder slides said moveable jaw portion closer to said stationary jaw portion and retraction of said fluidic cylinder slides said moveable jaw portion farther from said stationary jaw portion; and a processing mechanism coupled to said frame in a predetermined relation to said first gripping mechanism and said second gripping mechanism and being adapted to process said workpiece.

19. The machine, as set forth in claim 18, wherein said first and second predetermined paths extend generally along a defined axis.

20. The machine, as set forth in claim 18, wherein:
said first vise is coupled to said frame along said first predetermined path and adjacent said first gripping mechanism for cooperation therewith; and
said second vise is coupled to said frame along said second predetermined path and adjacent said second gripping mechanism for cooperation therewith.

21. The machine, as set forth in claim 20, wherein said processing mechanism is coupled to said frame between said first gripping mechanism and said second gripping mechanism and between said first vise and said second vise.

22. The machine, as set forth in claim 18, wherein said processing mechanism is coupled to said frame between said first gripping mechanism and said second gripping mechanism.

23. The machine, as set forth in claim 18, further comprising:
a control system being coupled to said first gripping mechanism and to said second gripping mechanism,
said control system selectively positioning said first gripping mechanism along said first predetermined path and selectively opening and closing said jaw of said first gripping mechanism, and selectively positioning said second gripping mechanism along said second predetermined path and selectively opening and closing said jaw of said second gripping mechanism.

24. A machine for processing an elongated workpiece, said machine comprising:
a frame;
a first gripping mechanism coupled to said frame and being controllably moveable on said frame along a first predetermined path, said first gripping mechanism having an openable and closeable jaw being positioned to respectively release and grip said workpiece;
second gripping mechanism coupled to said frame in spaced apart relation to said first gripping mechanism and being controllably moveable on said frame along a second predetermined path, said second gripping mechanism having an openable and closeable jaw being positioned to respectively release and grip said workpiece;
wherein each of said first and second gripping mechanisms comprise:
a base being coupled to said frame and being controllably moveable on said frame;
a first arm having an upper end portion and a lower end portion, said lower end portion of said first arm being coupled to said base and said upper end portion of said first arm extending upwardly from said base;
a member having a first end portion and a second end portion, said first end portion of said member being coupled to said first arm and said second end portion of said member being pivotally coupled to said base;
a second arm having an upper end portion and a lower end portion, said second arm being pivotally coupled to said member between said upper end portion and said lower end portion of said second arm, said upper end portion of said second arm being disposed adjacent said upper end portion of said first arm;
a first fluidic cylinder having a upper end portion and a lower end portion and being extendable and retractable, said lower end portion of said first fluidic cylinder being coupled to said member and said upper end portion of said first fluidic cylinder being coupled to said lower end portion of said second arm, so that extension of said first fluidic cylinder pivots said second arm to move said upper end portion of said second arm closer to said upper end portion of said first arm and retraction of said first fluid cylinder pivots said second arm to move said upper end portion of said second arm farther from said upper end portion of said first arm; and
a second fluidic cylinder having a upper end portion and a lower end portion and being extendable and retractable, said lower end portion of said second fluidic cylinder being coupled to said base and said upper end portion of said second fluidic cylinder being coupled to said lower end portion of said first arm, so that extension of said second fluidic cylinder pivots said member to move said upper end portions of said first and second arms upwardly and retraction of said second fluidic cylinder pivots said member to move said upper end portions of said first and second arms downwardly; and
a processing mechanism coupled to said frame in a predetermined relation to said first gripping mechanism and said second gripping mechanism and being adapted to process said workpiece.

25. A machine for processing an elongated workpiece, said machine comprising:
a frame having a main portion and having an elongated portion extending outwardly from said main portion generally along an X-axis;
a first gripping mechanism coupled to said main portion of said frame and being controllably moveable on said main portion of said frame along said X-axis, said first gripping mechanism having an openable and closeable jaw being positioned to respectively release and grip said workpiece;
a first vise coupled to said main portion of said frame above said first gripping mechanism, said first vise having an openable and closeable jaw being positioned to respectively release and grip said workpiece, said first gripping mechanism being moveable relative to said first vise;
a second gripping mechanism coupled to said elongated portion of said frame in spaced apart relation to said first gripping mechanism and being controllably moveable on said elongated portion of said frame along said X-axis, said second gripping mechanism having an openable and closeable jaw being positioned to respectively release and grip said workpiece;

second vise coupled to said main portion of said frame above said second gripping mechanism, said second vise having an openable and closeable jaw being positioned to respectively release and grip said workpiece, said second gripping mechanism being moveable relative to and under said second vise;

wherein each of said first and second vises comprise:
a stationary jaw portion being rigidly coupled to said frame;
a moveable jaw portion being slidably coupled to said frame opposite said stationary jaw portion; and
a fluidic cylinder having a first end portion and a second end portion and being extendable and retractable, said first end portion of said fluidic cylinder being coupled to said frame and said second end portion of said fluidic cylinder being coupled to said moveable jaw portion, so that extension of said fluidic cylinder slides said moveable jaw portion closer to said stationary jaw portion and retraction of said fluidic cylinder slides said moveable jaw portion farther from said stationary jaw portion; and
a processing mechanism coupled to said main portion of said frame above and in a predetermined relation to said first vise and said second vise and being adapted to process said workpiece.

26. The machine, as set forth in claim 25, wherein each of said first and second gripping mechanisms comprise:
a base being coupled to said frame and being controllably moveable on said frame;
a first arm having an upper end portion and a lower end portion, said lower end portion of said first arm being coupled to said base and said upper end portion of said first arm extending upwardly from said base;
a member having a first end portion and a second end portion, said first end portion of said member being coupled to said first arm and said second end portion of said member being pivotally coupled to base;
a second arm having an upper end portion and a lower end portion, said second arm being pivotally coupled to said member between said upper end portion and said lower end portion of said second arm, said upper end portion of said second arm being disposed adjacent said upper end portion of said first arm;
a first fluidic cylinder having a upper end portion and a lower end portion and being extendable and retractable, said lower end portion of said first fluidic cylinder being coupled to said member and said upper end portion of said first fluidic cylinder being coupled to said lower end portion of said second arm, so that extension of said first fluidic cylinder pivots said second arm to move said upper end portion of said second arm closer to said upper end portion of said first arm and retraction of said first fluidic cylinder pivots said second arm to move said upper end portion of said second arm farther from said upper end portion of said first arm; and
a second fluidic cylinder having a upper end portion and a lower end portion and being extendable and retractable, said lower end portion of said second fluidic cylinder being coupled to said base and said upper end portion of said second fluidic cylinder being coupled to said lower end portion of said first arm, so that extension of said second fluidic cylinder pivots said member to move said upper end portions of said first and second arms upwardly and retraction of said second fluidic cylinder pivots said member to move said upper end portions of said first and second arms downwardly.

27. The machine, as set forth in claim 25, wherein said processing mechanism comprises a saw.

28. The machine, as set forth in claim 27, wherein said saw comprises:
a multi-axis mounting coupled to said saw, said mounting being moveable about a plurality of axes to position said saw relative to said workpiece.

29. The machine, as set forth in claim 28, wherein said multi-axis mounting comprises:
a curved arm having an upper end portion and a lower end portion, said upper end portion being pivotally coupled to an overhead portion of said main portion of said frame, said curved arm being pivotable about a C-axis perpendicular to said X-axis;
a mounting member being coupled to said lower end portion of said curved arm; and
a lever arm having a first end portion and a second end portion, said first end portion of said lever arm being coupled to said saw and said second end portion of said lever arm being pivotally coupled to said mounting member, said lever arm being pivotable about an A-axis perpendicular to said C-axis.

30. The machine, as set forth in claim 29, wherein said mounting member is pivotally coupled to said lower end portion of said curved arm, said mounting member being pivotable about a B-axis perpendicular to said C-axis and to said A-axis.

31. The machine, as set forth in claim 30, wherein said overhead portion of said frame comprises:
a plate being slidably coupled to said main portion of said frame above said saw, and being slidably moveable along a Y-axis perpendicular to said C-axis and to said X-axis.

32. The machine, as set forth in claim 25, further comprising:
a control system being coupled to said first gripping mechanism, to said second gripping mechanism, to said first vise, and to said second vise,
said control system selectively positioning said first gripping mechanism along said X-axis and selectively opening and closing said jaw of said first gripping mechanism, selectively positioning said second gripping mechanism along said X-axis and selectively opening and closing said jaw of said second gripping mechanism, selectively opening and closing said jaw of said first vise, and selectively opening and closing said jaw of said second vise.

33. The machine, as set forth in claim 25, wherein said first vise and said second vise are fixedly coupled to said frame.

34. The machine, as set forth in claim 33, wherein said first vise is coupled to said main portion of said frame adjacent one side of said processing mechanism and wherein said second vise is coupled to said main portion of said frame adjacent the other side of said processing mechanism.

35. A machine for processing an elongated workpiece, said machine comprising:
a frame;

a first gripping mechanism coupled to said frame and being controllably moveable on said frame along a first predetermined path, said first gripping mechanism having an openable and closeable jaw being positioned to respectively release and grip said workpiece;

a second gripping mechanism coupled to said frame in spaced apart relation to said first gripping mechanism and being controllably moveable on said frame along a second predetermined path, said second gripping mechanism having an openable and closeable jaw being positioned to respectively release and grip said workpiece;

a saw coupled to said frame in a predetermined relation to said first gripping mechanism and said second gripping mechanism and being adapted to process said workpiece;

a multi-axis mounting coupled to said saw, said mounting being moveable about a plurality of axes to position said raw relative to said workpiece, said multi-axis mounting having a curved arm having an upper end portion and a lower end portion, said upper end portion being pivotally coupled to an overhead portion of said frame, said curved arm being pivotable about a first axis perpendicular to said workpiece;

a mounting member being coupled to said lower end portion of said curved arm; and a lever arm having a first end portion and a second end portion, said first end portion of said lever arm being coupled to said saw and said second end portion of said lever arm being pivotally coupled to said mounting member, said lever arm being pivotable about a second axis perpendicular to said first axis.

36. The machine, as set forth in claim 35, wherein said mounting member is pivotally coupled to said lower end portion of said curved arm, said mounting member being pivotable about a third axis perpendicular to said first axis and to said second axis.

37. The machine, as set forth in claim 36, wherein said overhead portion of said frame comprises:

a plate being slidably coupled to said frame, and being slidably moveable along a fourth axis perpendicular to said first axis and to said workpiece.

* * * * *

UNITED STATES PATENT AND TRADEMARK OFFICE
CERTIFICATE OF CORRECTION

PATENT NO. : 5,315,906
DATED : May 31, 1994
INVENTOR(S) : Laszlo Ferenczi, Mark A. Turner, and Gregory A. Prince It is certified that error appears in the above-indentified patent and that said Letters Patent is hereby corrected as shown below:

Column 13, line 8, "11211" should be --"2"--.

Signed and Sealed this

Eighteenth Day of October, 1994

Attest:

BRUCE LEHMAN

Attesting Officer    Commissioner of Patents and Trademarks